US009774425B2

(12) United States Patent
Oh et al.

(10) Patent No.: US 9,774,425 B2
(45) Date of Patent: Sep. 26, 2017

(54) FRAME TRANSMITTING METHOD AND FRAME RECEIVING METHOD

(71) Applicant: NEWRACOM, INC., Irvine, CA (US)

(72) Inventors: Jongee Oh, Irvine, CA (US); Youngha Lee, Daejeon (KR); Inkyeong Choi, Daejeon (KR)

(73) Assignee: NEWRACOM, INC., Irvine, CA (US)

( * ) Notice: Subject to any disclaimer, the term of this patent is extended or adjusted under 35 U.S.C. 154(b) by 29 days.

(21) Appl. No.: 14/855,326

(22) Filed: Sep. 15, 2015

(65) Prior Publication Data

US 2016/0080122 A1 Mar. 17, 2016

(30) Foreign Application Priority Data

| Sep. 16, 2014 | (KR) | 10-2014-0123014 |
| Sep. 22, 2014 | (KR) | 10-2014-0126122 |
| Sep. 23, 2014 | (KR) | 10-2014-0127093 |
| Sep. 10, 2015 | (KR) | 10-2015-0128231 |

(51) Int. Cl.
*H04L 5/00* (2006.01)
*H04L 27/26* (2006.01)

(52) U.S. Cl.
CPC .......... *H04L 5/0007* (2013.01); *H04L 5/0048* (2013.01); *H04L 27/2602* (2013.01)

(58) Field of Classification Search
CPC .............. H04L 27/2602; H04L 5/0007; H04L 5/0048; H04L 5/0046

See application file for complete search history.

(56) References Cited

U.S. PATENT DOCUMENTS

| 9,397,805 | B2 * | 7/2016 | Vermani | ............... H04L 5/0044 |
| 2004/0081123 | A1 * | 4/2004 | Krishnan | .............. H04L 1/0004 370/329 |
| 2010/0246505 | A1 * | 9/2010 | Chong | ................ H04W 72/044 370/329 |
| 2015/0223247 | A1 * | 8/2015 | Yang | ..................... H04L 5/0007 370/329 |

(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

(Continued)

*Primary Examiner* — Ahmed Elallam
(74) *Attorney, Agent, or Firm* — McDermott, Will & Emery LLP

(57) ABSTRACT

A frame transmitting method by a device in a wireless communication network is provided. The device generates a symbol using a part of a plurality of resource units having a different number of tones and transmits a frame including the symbol. A length of symbol duration excluding a guard interval in the symbol is 12.8 μs. The plurality of resource units includes a first resource unit having 26 tones and a second resource unit having 52 tones. Two tones in the 26 tones of the first resource unit are used as pilot tones, and four tones in the 52 tones of the second resource unit are used as pilot tones.

10 Claims, 38 Drawing Sheets

(56) References Cited

U.S. PATENT DOCUMENTS

| | | | | |
|---|---|---|---|---|
| 2015/0349995 | A1* | 12/2015 | Zhang | H04L 5/0048 375/295 |
| 2015/0365203 | A1* | 12/2015 | Suh | H04L 5/0007 370/330 |
| 2016/0087766 | A1* | 3/2016 | Sun | H04L 5/0007 370/329 |
| 2016/0105271 | A1* | 4/2016 | Shahrnaz | H04L 5/0058 370/329 |
| 2016/0142187 | A1* | 5/2016 | Yang | H04L 27/2602 370/328 |
| 2016/0156438 | A1* | 6/2016 | Sun | H04L 5/0007 370/330 |
| 2016/0165589 | A1* | 6/2016 | Chu | H04L 5/0007 370/329 |
| 2016/0165598 | A1* | 6/2016 | Azizi | H04W 72/0413 370/336 |
| 2016/0226638 | A1* | 8/2016 | Azizi | H04L 5/0048 |
| 2016/0286537 | A1* | 9/2016 | Ghosh | H04L 5/0007 |
| 2016/0329999 | A1* | 11/2016 | Li | H04L 5/0007 |
| 2016/0330300 | A1* | 11/2016 | Josiam | H04L 69/22 |
| 2016/0345202 | A1* | 11/2016 | Bharadwaj | H04W 28/065 |
| 2016/0353414 | A1* | 12/2016 | Choi | H04W 72/04 |
| 2016/0374017 | A1* | 12/2016 | Stacey | H04W 52/0216 |
| 2016/0374020 | A1* | 12/2016 | Azizi | H04W 72/042 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner 26 tones 56 tones 52 tones 114 tones

FRAME TRANSMITTING METHOD AND FRAME RECEIVING METHOD

CROSS-REFERENCE TO RELATED APPLICATIONS

This application claims priority to and the benefit of Korean Patent Applications No. 10-2014-0123014 filed on Sep. 16, 2014, No. 10-2014-0126122 filed on Sep. 22, 2014, No. 10-2014-0127093 filed on Sep. 23, 2014, and No. 10-2015-0128231 filed on Sep. 10, 2015, in the Korean Intellectual Property Office, the entire contents of which are incorporated herein by reference.

BACKGROUND (a) Field

The described technology relates generally to a frame transmitting method and a frame receiving method. More particularly, the described technology relates generally to a frame transmitting method and a frame receiving method in a wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications."

After an original standard was published in 1999, new version standards are continuously published by amendments. The IEEE standard 802.11a (IEEE Std 802.11a-1999) supporting 2.4 GHz band was published in 1999, the IEEE standard 802.11b (IEEE Std 802.11b-1999) supporting 5 GHz band was published in 1999, and the IEEE standard 802.11g (IEEE Std 802.11g-2003) supporting 5 GHz band was published in 2003. These standards are called legacy. Subsequently, the IEEE standard 802.11n (IEEE Std 802.11n-2009) for enhancements for higher throughput (HT) was published in 2009, and the IEEE standard 802.11 ac (IEEE 802.11 ac-2013) for enhancements for very high throughput (VHT) was published in 2013. Recently, a high efficiency (HE) WLAN for enhancing the system throughput in high density scenarios is being developed by the IEEE 802.11ax task group.

The HE WLAN or a subsequent WLAN may use a multi-user transmission. For example, a device may simultaneously transmit data to a plurality of devices or the plurality of devices may simultaneously transmit data by using a scheme such as orthogonal frequency division multiple access (OFDMA).

For the multi-user transmission, a given bandwidth may be divided into a plurality of subbands and the plurality of bands may be allocated to multi users. In this case, since a resource unit used in the subband is different from a resource unit used in a previous version WLAN, hardware of a previous version WLAN device cannot be reused.

SUMMARY

An embodiment of the present disclosure provides a frame transmitting method and a frame receiving method for supporting an OFDMA transmission.

Another embodiment of the present disclosure provides a frame transmitting method and a frame receiving method for reusing hardware of a previous version WLAN device.

According to an embodiment, a method of transmitting a frame by a device in a wireless communication network is provided. The method includes generating a symbol using a part of a plurality of resource units having a different number of tones and transmitting a frame including the symbol. A length of symbol duration excluding a guard interval in the symbol is 12.8 µs. The plurality of resource units includes a first resource unit having 26 tones and a second resource unit having 52 tones. Two tones in the 26 tones of the first resource unit are used as pilot tones, and four tones in the 52 tones of the second resource unit are used as pilot tones.

Subcarrier spacing of the symbol may be 78.125 kHz.

The first resource unit may be a minimum resource unit among the plurality of resource units.

The plurality of resource units may further include a third resource unit having 242 tones, and eight tones in the 242 tones of the third resource unit may be used as pilot tones.

The plurality of resource units may have four types of resource units when the frame is transmitted on a 20 MHz band.

The symbol may include 256 tones when the frame is transmitted on a 20 MHz band.

The symbol may include 512 tones when the frame is transmitted on a 40 MHz band. The symbol may include 1028 tones when the frame is transmitted on an 80 MHz band. The symbol may include 2048 tones when the frame is transmitted on a 160 MHz band.

According to another embodiment, a method of receiving a frame by a device in a wireless communication network is provided. The method includes receiving a frame including a symbol, and decoding data included in a part of a plurality of resource units having a different number of tones from the symbol. A length of symbol duration excluding a guard interval in the symbol is 12.8 µs. The plurality of resource units includes a first resource unit having 26 tones and a second resource unit having 52 tones. Two tones in the 26 tones of the first resource unit are used as pilot tones, and four tones in the 52 tones of the second resource unit are used as pilot tones.

Subcarrier spacing of the symbol may be 78.125 kHz.

The first resource unit may be a minimum resource unit among the plurality of resource units.

The plurality of resource units may further include a third resource unit having 242 tones, and eight tones in the 242 tones of the third resource unit may be used as pilot tones.

The plurality of resource units may have four types of resource units when the frame is transmitted on a 20 MHz band.

The symbol may include 256 tones when the frame is transmitted on a 20 MHz band.

The symbol may include 512 tones when the frame is transmitted on a 40 MHz band. The symbol may include 1028 tones when the frame is transmitted on an 80 MHz band. The symbol may include 2048 tones when the frame is transmitted on a 160 MHz band.

According to yet another embodiment, an apparatus for transmitting a frame in a wireless communication network is provided. The apparatus includes a processor and a transceiver. The processor generates a symbol using a part of a plurality of resource units having a different number of tones. The transceiver transmits a frame including the symbol. A length of symbol duration excluding a guard interval in the symbol is 12.8 µs. The plurality of resource units includes a first resource unit having 26 tones and a second resource unit having 52 tones. Two tones in the 26 tones of the first resource unit are used as pilot tones, and four tones in the 52 tones of the second resource unit are used as pilot tones.

According to still another embodiment, an apparatus for receiving a frame in a wireless communication network is provided. The apparatus includes a processor and a transceiver. The transceiver receives a frame including a symbol. The processor decodes data included in a part of a plurality of resource units having a different number of tones from the symbol. A length of symbol duration excluding a guard interval in the symbol is 12.8 µs. The plurality of resource units includes a first resource unit having 26 tones and a second resource unit having 52 tones. Two tones in the 26 tones of the first resource unit are used as pilot tones, and four tones in the 52 tones of the second resource unit are used as pilot tones.

DETAILED DESCRIPTION OF EMBODIMENTS

Figure 1:
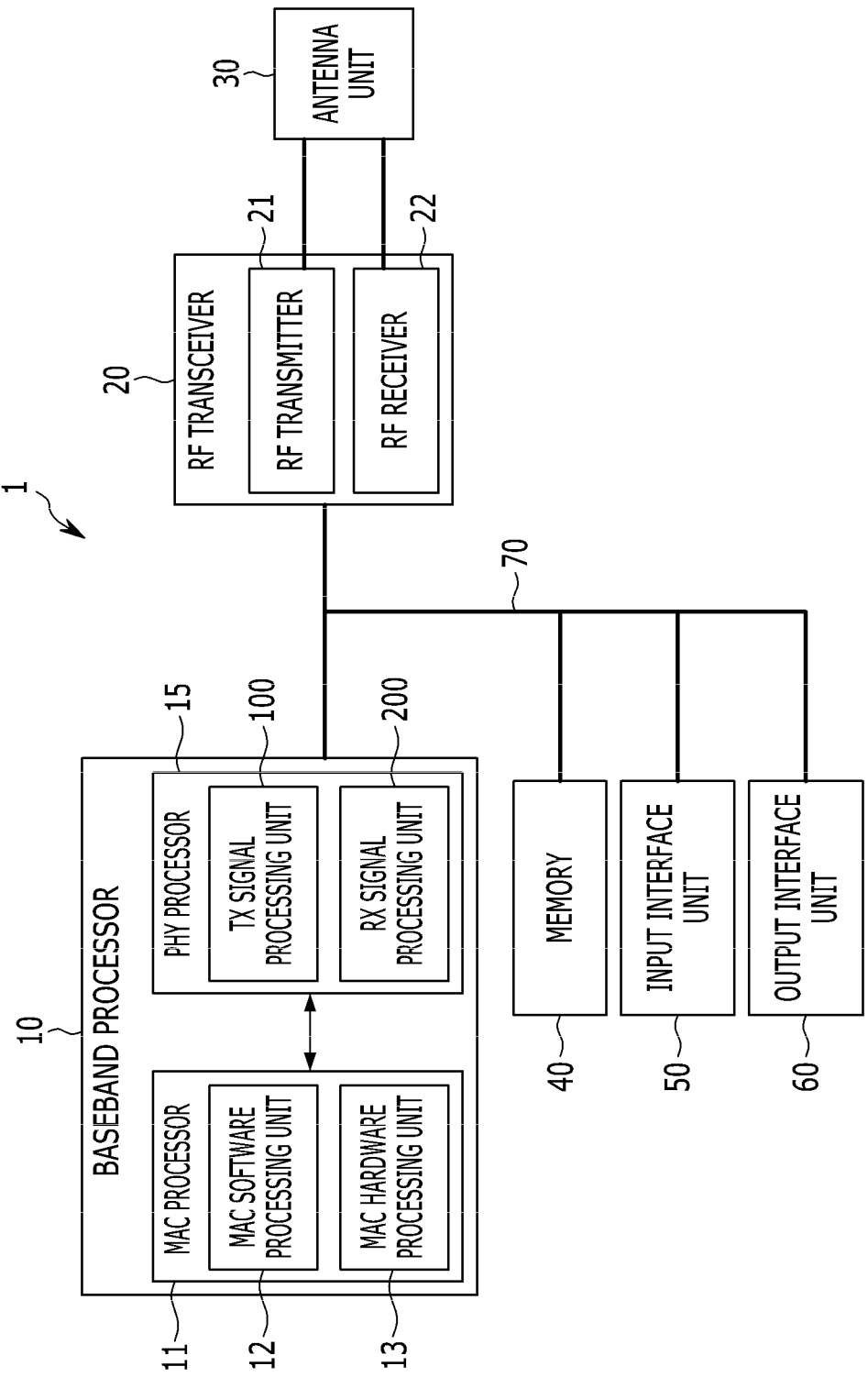
FIG. 1 is a schematic block diagram of a WLAN device according to an embodiment.

In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all of the plurality of WLAN devices may be non-AP STAs in ad-hoc networking In general, the AP STA and the non-AP STA may be collectively called the STAs. However, for ease of description, herein, only the non-AP STA are referred to as the STAs.

FIG. 1 is a schematic block diagram exemplifying a WLAN device according to an embodiment.

Referring to FIG. 1, the WLAN device 1 includes a baseband processor 10, a radio frequency (RF) transceiver 20, an antenna unit 30, a memory 40 including non-transitory computer-readable media, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this.

The PHY processor 15 includes a transmitting (Tx) signal processing unit 100 and a receiving (Rx) signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
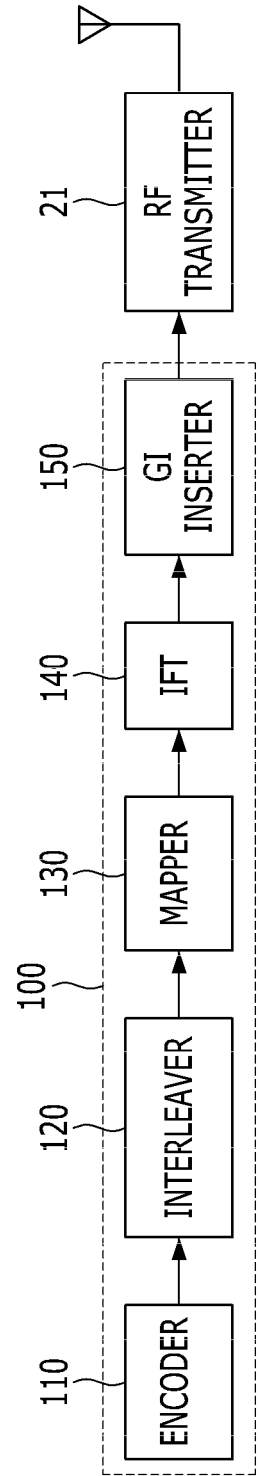
FIG. 2 is a schematic block diagram of a transmitting signal processor in an embodiment suitable for use in a WLAN.

FIG. 2 is a schematic block diagram of a transmitting signal processor 100 in an embodiment suitable for use in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams $N_{SS}$. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
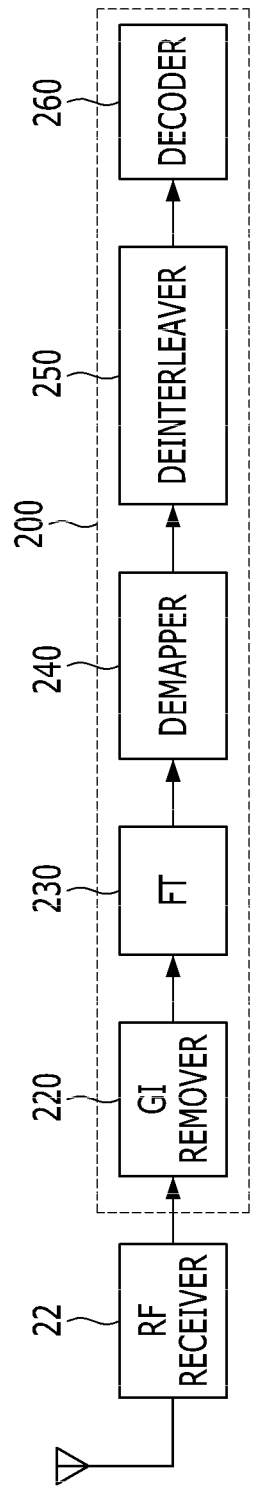
FIG. 3 is a schematic block diagram of a receiving signal processing unit in an embodiment suitable for use in the WLAN.

FIG. 3 is a schematic block diagram of a receiving signal processing unit according to an embodiment suitable for use in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may include a spatial demapper for converting the Fourier transformed received symbols to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
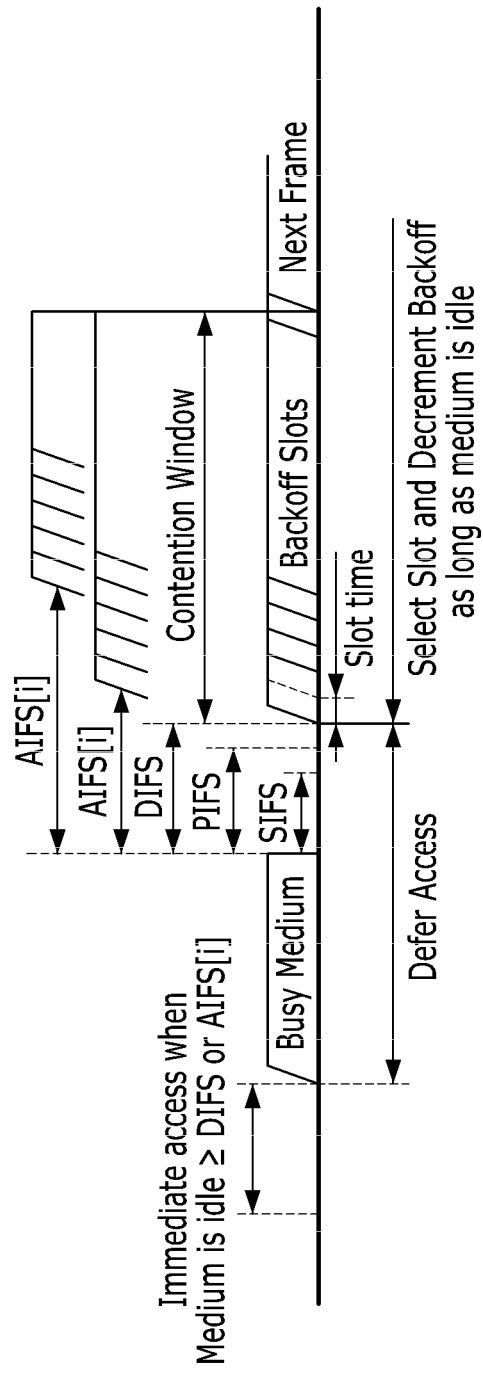
FIG. 4 exemplifies illustrates Inter-Frame Space (IFS) relationships.

FIG. 4 illustrates interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. When the control frame is not a response frame of a previous frame, the WLAN device transmits the control frame after performing backoff when the DIFS has elapsed. When the control frame is the response frame of a previous frame, the WLAN device transmits the control frame without performing backoff when a short IFS (SIFS) has elapsed. The type and subtype of a frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC], has elapsed. In this case, the data frame, the management frame, or the control frame which is not the response frame may use the AIFS[AC].

Figure 5:
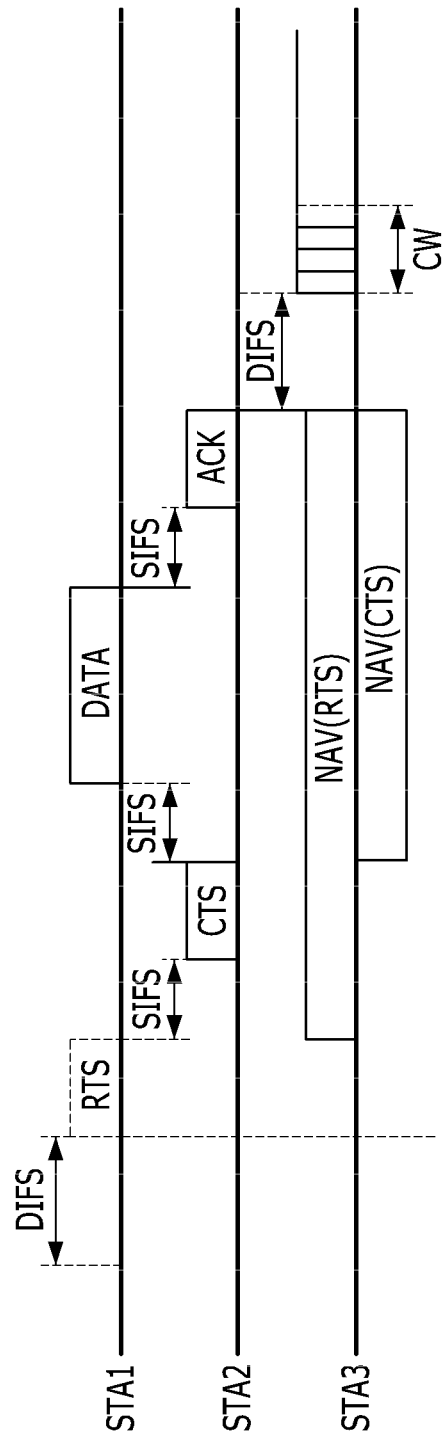
FIG. 5 is a schematic diagram illustrating a CSMA/CA based frame transmission procedure for avoiding collision between frames in a channel.

FIG. 5 is a schematic diagram illustrating a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a third WLAN device which may be located at an area where a frame transmitted from the STA1 and/or a frame transmitted from the STA2 can be received by the third WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, that the channel is idle), the STA1 may transmit an RTS frame to the STA2 after performing backoff. Upon receiving the RTS frame, the STA2 may transmit a CTS frame as a response of the CTS frame after a SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. For example, the NAV timer may be set for a duration of SIFS+CTS frame duration+SIFS+data frame duration+SIFS+ACK frame duration. When the STA3 receives the CTS frame, it may set the NAV timer for a transmission duration of subsequently transmitted frames (for example, a duration of SIFS+data frame duration+ SIFS+ACK frame duration) by using duration information included in the RTS CTS frame. For example, the NAV timer may be set for a duration of SIFS+data frame duration+SIFS+ACK frame duration. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff elapses.

Now, a frame transmitting method and a frame receiving method in a wireless communication network according to an embodiment are described with reference to the drawings. The wireless communication network according to an embodiment may be a WLAN. Particularly, the wireless communication network according to an embodiment may be a high efficiency (HE) WLAN developed by the IEEE 802.11ax task group. Hereinafter, it is assumed for convenience that the wireless communication network according to an embodiment is the HE WLAN.

Figure 6:
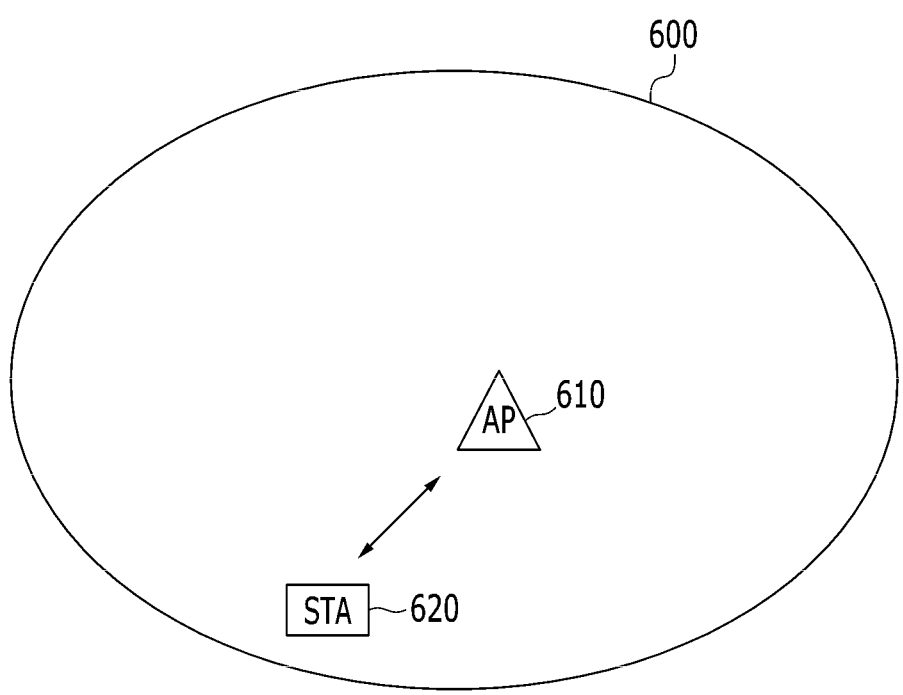
FIG. 6 shows an example of a wireless communication network according to an embodiment.

FIG. 6 shows an example of a wireless communication network according to an embodiment.

Referring to FIG. 6, a basic service set (BSS) 600 includes a plurality of wireless local area network (WLAN) devices. The plurality of WLAN devices includes an access point (AP) 610 and a non-AP station, i.e., a station 620.

The AP 610 and the station 620 are devices supporting the wireless communication network according to an embodiment, i.e., the HE WLAN. Hereinafter, such devices referred to as HE devices. An AP supporting the HE WLAN is referred to as a HE-AP and a station supporting the HE WLAN is referred to as a HE-STA.

The BSS 600 may further include a previous version device. The previous version device may be, for example, a device (hereinafter referred to as a "legacy device") supporting the IEEE standard 802.11a, 802.11b or 802.11g (IEEE Std 802.11a-1999, IEEE Std 802.11b-1999 or IEEE Std 802.11g-2003), a device (hereinafter referred to as an "HT device") supporting the IEEE standard 802.11n (IEEE Std 802.11n-2009) for enhancements for higher throughput (HT), or a device (hereinafter referred to as a "VHT device") supporting the IEEE standard 802.11ac (IEEE Std 802.11ac-2013) for enhancements for very high throughput (VHT).

Figure 7:
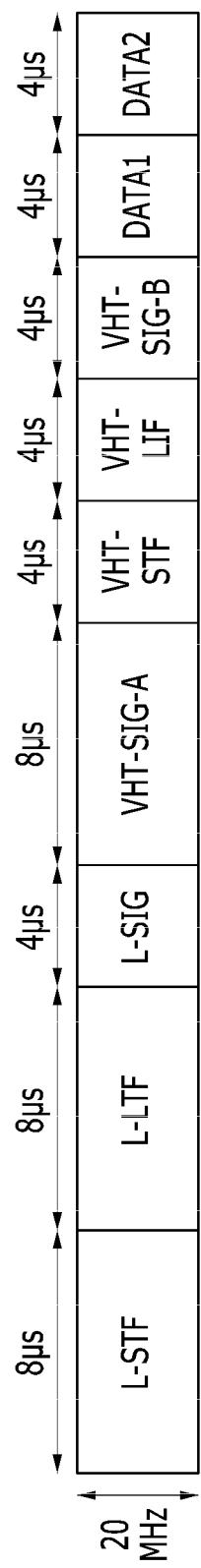
FIG. 7 schematically shows a frame format of a VHT 20 MHz mode.
Figure 8:
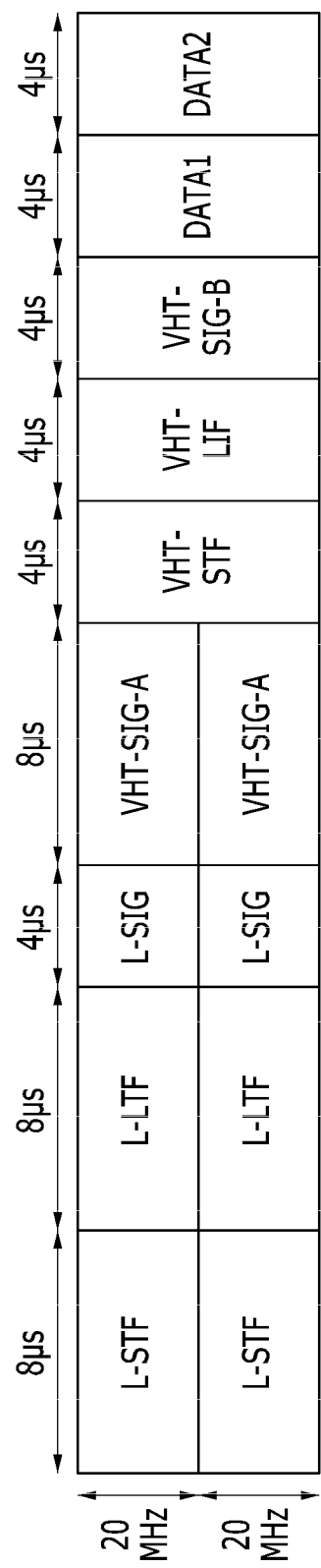
FIG. 8 schematically shows a frame format of a VHT 40 MHz mode.
Figure 9:
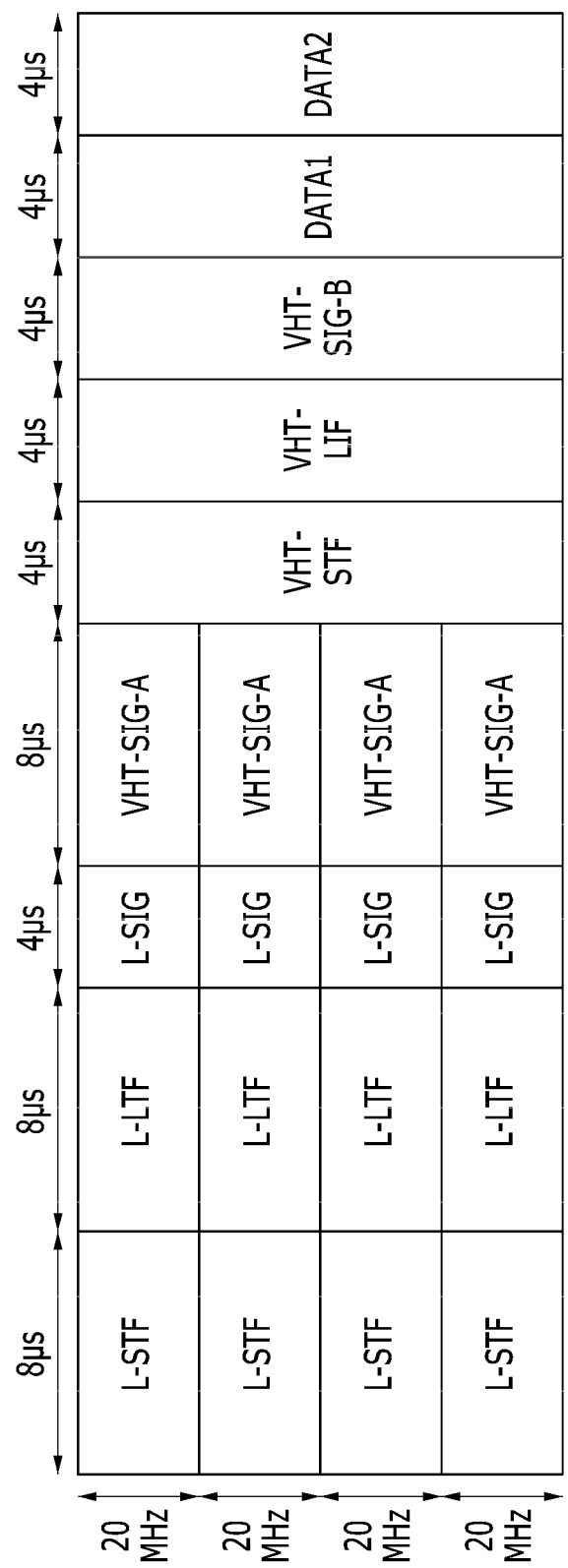
FIG. 9 schematically shows a frame format of a VHT 80 MHz mode.
Figure 10:
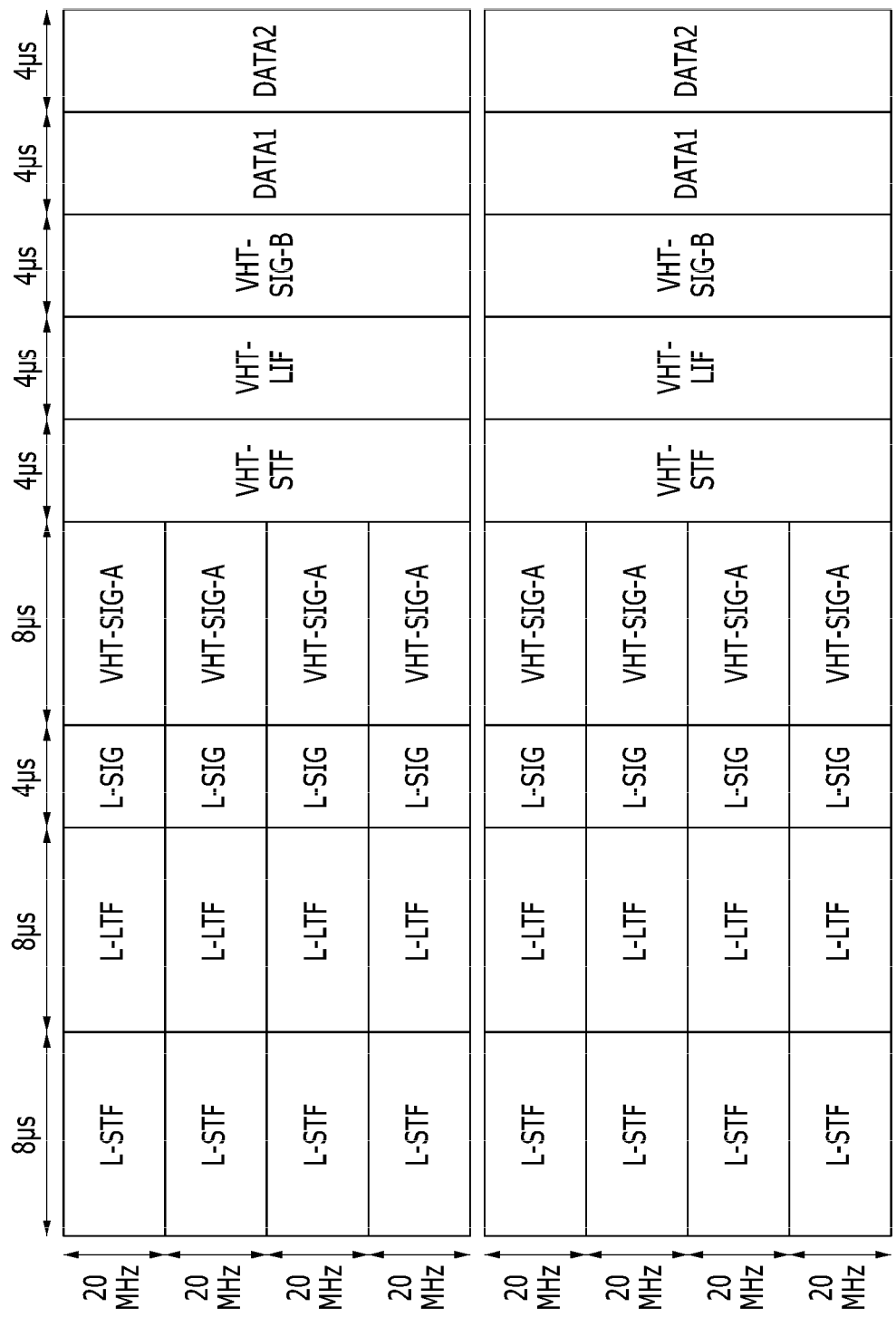
FIG. 10 schematically shows a frame format of a VHT 160 MHz mode.

FIG. 7 schematically shows a frame format of a VHT 20 MHz mode, FIG. 8 schematically shows a frame format of a VHT 40 MHz mode, FIG. 9 schematically shows a frame format of a VHT 80 MHz mode, and FIG. 10 schematically shows a frame format of a VHT 160 MHz mode. Frames shown in FIG. 7 to FIG. 10 are PHY frames and may be for example PLCP (physical layer convergence procedure) protocol data units (PLCP protocol data units, PPDUs).

In a WLAN (hereinafter referred to as a "VHT WLAN") supporting the IEEE standard 802.11ac (IEEE 802.11ac-2013), an entire channel width is divided into basic bandwidths (for example, 20 MHz bandwidths). The entire channel width may be divided into a primary channel having the 20 MHz bandwidth, a secondary channel (hereinafter referred to as a "secondary 20 MHz channel") having the 20 MHz bandwidth, a second channel (hereinafter referred to as a "secondary 40 MHz channel") having a 40 MHz bandwidth, and a secondary channel (hereinafter referred to as a "secondary 80 MHz channel") having an 80 MHz bandwidth, by a combination of the basic bandwidths.

An orthogonal frequency division multiplexing (OFDM) based VHT WLAN supports a VHT 20 MHz mode using the 20 MHz bandwidth, a VHT 40 MHz mode using the 40 MHz bandwidth, a VHT 80 MHz mode using the 80 MHz bandwidth, and a VHT 160 MHz mode using a 160 MHz bandwidth based on the primary channel and the secondary channels. The VHT 20 MHz mode uses the primary channel, the VHT 40 MHz mode uses the primary channel and the secondary 20 MHz channel, the VHT 80 MHz mode uses the primary channel, the secondary 20 MHz channel and the secondary 40 MHz channel, and the VHT 160 MHz mode uses the primary channel, the secondary 20 MHz channel, the secondary 40 MHz channel and the secondary 80 MHz channel.

Referring to FIG. 7, a frame of the VHT 20 MHz mode includes a legacy preamble part, a VHT preamble part, and a data field.

The legacy preamble part includes a legacy short training field (L-STF), a legacy long training field (L-LTF), and a legacy signal field (L-SIG). The VHT preamble part includes a VHT signal field (VHT-SIG-A), a VHT short training field (VHT-STF), a VHT long training field (VHT-LTF), and an additional VHT signal field (VHT-SIG-B).

The L-STF may be used for initial synchronization, signal detection, and automatic gain control. The L-LTF may be used for fine frequency synchronization and channel estimation. The L-SIG may include length information indicating a length of the entire frame.

The VHT-SIG-A follows the L-SIG and carries signaling information for a VHT device. The VHT-SIG-A includes two symbols. The length information of the L-SIG and the signaling information of the VHT-SIG-A may be decoded based on the channel information estimated by the L-LTF. The VHT-STF follows the VHT-SIG-A and may be used for automatic gain control. The VHT-STF corresponds to one symbolThe VHT-LTF follows the VHT-STF and may be used for multiple input multiple output (MIMO) channel estimation. The number of VHT-LTFs may be determined based on the number of antennas used for the MIMO transmission, i.e., the number of space-time streams. The VHT-SIG-B follows the VHT-LTF and carries additional signaling information. The VHT-SIG-B corresponds to one symbol.

In one symbol, symbol duration excluding a guard interval (GI) has 3.2 µs length. The GI may be formed using a cyclic prefix (CP) of the symbol duration. In a long GI format using ¼ CP, the GI has 0.8 µs length and an entire symbol length is 4.0 µs. In a short GI format using ⅛ CP, the GI has 0.4 µs length and an entire symbol length is 3.6 µs.

Referring to FIG. 8, FIG. 9, and FIG. 10, each of a frame of the VHT 40 MHz mode, a frame of the VHT 80 MHz mode, and a frame of the VHT 160 MHz mode includes a legacy preamble part, a VHT preamble part, and a data field, like the frame of the VHT 20 MHz mode.

The L-STF, the L-LTF, the L-SIG, and the VHT-SIG-A are transmitted by being encoded by a basic bandwidth unit. The L-STF, the L-LTF, the L-SIG, and the VHT-SIG-A of the primary channel may be duplicated to other bandwidth.

In the VHT 40 MHz mode, the VHT-STF, the VHT-LTF, the VHT-SIG-B, and the data field are transmitted by being encoded by a 40 MHz bandwidth unit. In the VHT 80 MHz mode, the VHT-STF, the VHT-LTF, the VHT-SIG-B, and the data field are transmitted by being encoded by an 80 MHz bandwidth unit. In the VHT 160 MHz mode, the VHT-STF, the VHT-LTF, the VHT-SIG-B, and the data field are transmitted by being encoded by the 80 MHz bandwidth unit.

In such the VHT frame, since a 64 point FFT is used on the 20 MHz basic bandwidth, each symbol includes 64 subcarriers on the basic bandwidth.

In the L-SIG and the VHT-SIG-A, one tone is used as a direct current (DC) tone and eleven tones are used as guard tones among the 64 subcarriers, i.e., 64 tones, for backward compatibility with a legacy device. Accordingly, 52 tones are available tones among the 64 tones. Among the 52 available tones, 48 tones are used as data tones and 4 tones are used as pilot tones.

The data field of the VHT 20 MHz mode uses one center tone as the DC tone and seven edge tones as the guard tones among the 64 subcarriers, i.e., the 64 tones. Accordingly, 56 tones are available tones among the 64 tones. The data field of the VHT 20 MHz mode uses 52 tones as the data tones and 4 tones as the pilot tones among the 56 available tones.

The data field of the VHT 40 MHz mode uses three center tones as the DC tones and eleven edge tones as the guard tones among 128 subcarriers, i.e., 128 tones. Accordingly, 114 tones are available tones among the 128 tones. The data field of the VHT 40 MHz mode uses 108 tones as the data tones and 6 tones as the pilot tones among the 114 available tones.

The data field of the VHT 80 MHz mode uses three center tones as the DC tones and eleven edge tones as the guard tones among 256 subcarriers, i.e., 256 tones. Accordingly, 242 tones are available tones among the 256 tones. The data field of the VHT 80 MHz mode uses 234 tones as the data tones and 8 tones as the pilot tones among the 242 available tones.

Since the VHT 160 MHz mode has a form in which the VHT 80 MHz mode is repeated twice, the data field of the VHT 160 MHz mode uses 234*2 (=486) tones as the data tones and 8*2 (=16) tones as the pilot tones.

In the VHT 20 MHz mode, the VHT 40 MHz mode, the VHT 80 MHz mode, and the VHT 160 MHz mode, the VHT-STF, the VHT-LTF, and the VHT-SIG-B may use the data tones and the pilot tones like the data field.

On the other hand, an 1 MHz mode using an 1 MHz bandwidth is supported in the IEEE standard 802.11ah supporting 1 GHz or less band. Since the data field of the 1 MHz mode uses a 32 point FFT, 32 subcarriers are used. In this case, the data field of the 1 MHz mode uses 24 tones as the data tones and 2 tones as the pilot tones.

Next, a frame format in a wireless communication network according to an embodiment is described.

Figure 11:
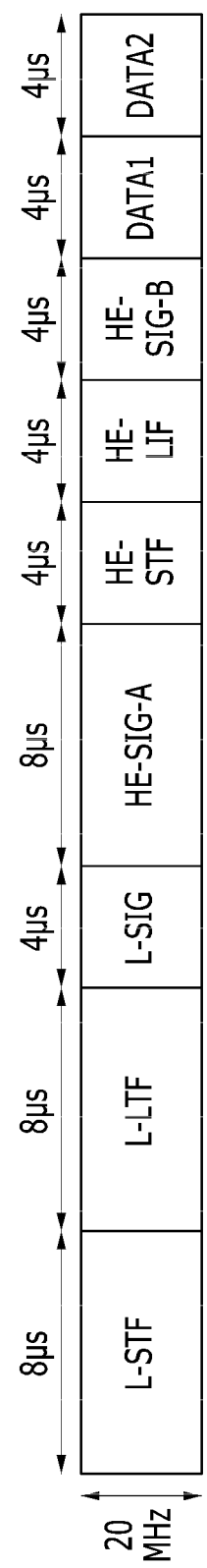
FIG. 11 schematically shows a frame format of a 20 MHz OFDM mode in a wireless communication network according to an embodiment.
Figure 12:
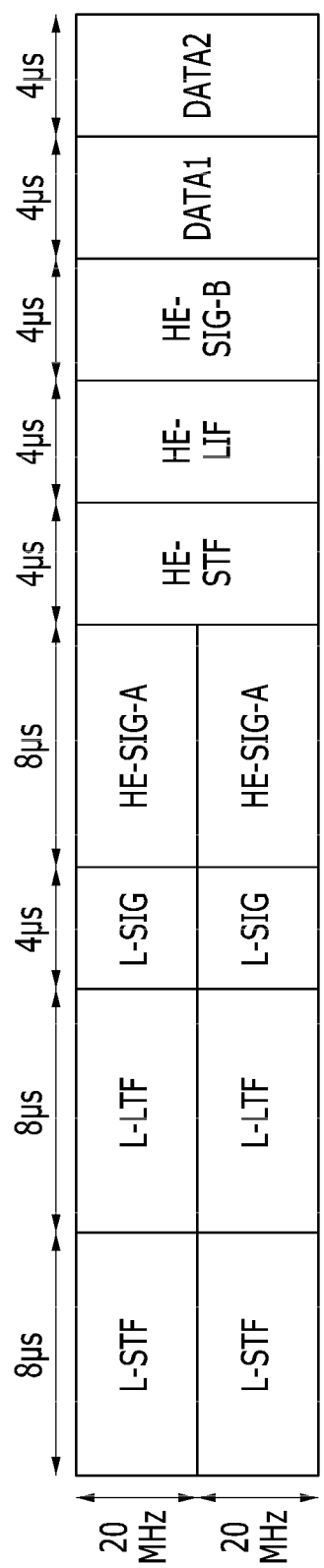
FIG. 12 schematically shows a frame format of a 40 MHz OFDM mode in a wireless communication network according to an embodiment.
Figure 13:
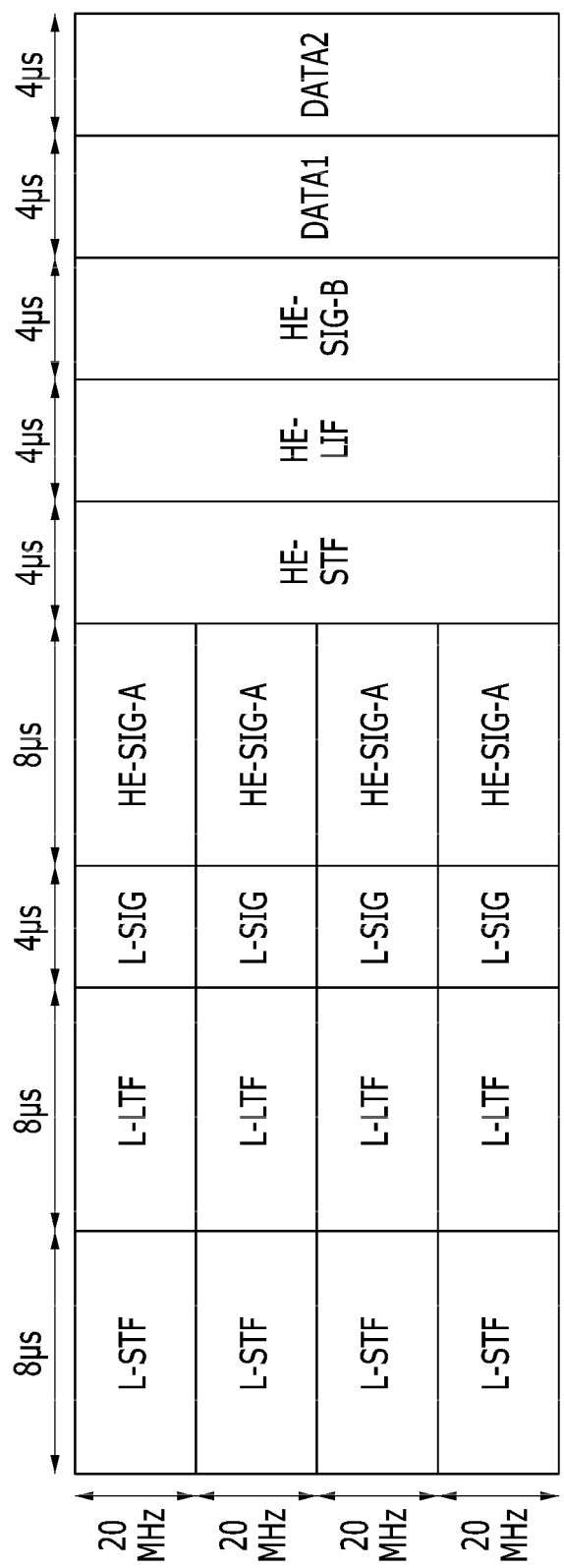
FIG. 13 schematically shows a frame format of an 80 MHz OFDM mode in a wireless communication network according to an embodiment.
Figure 14:
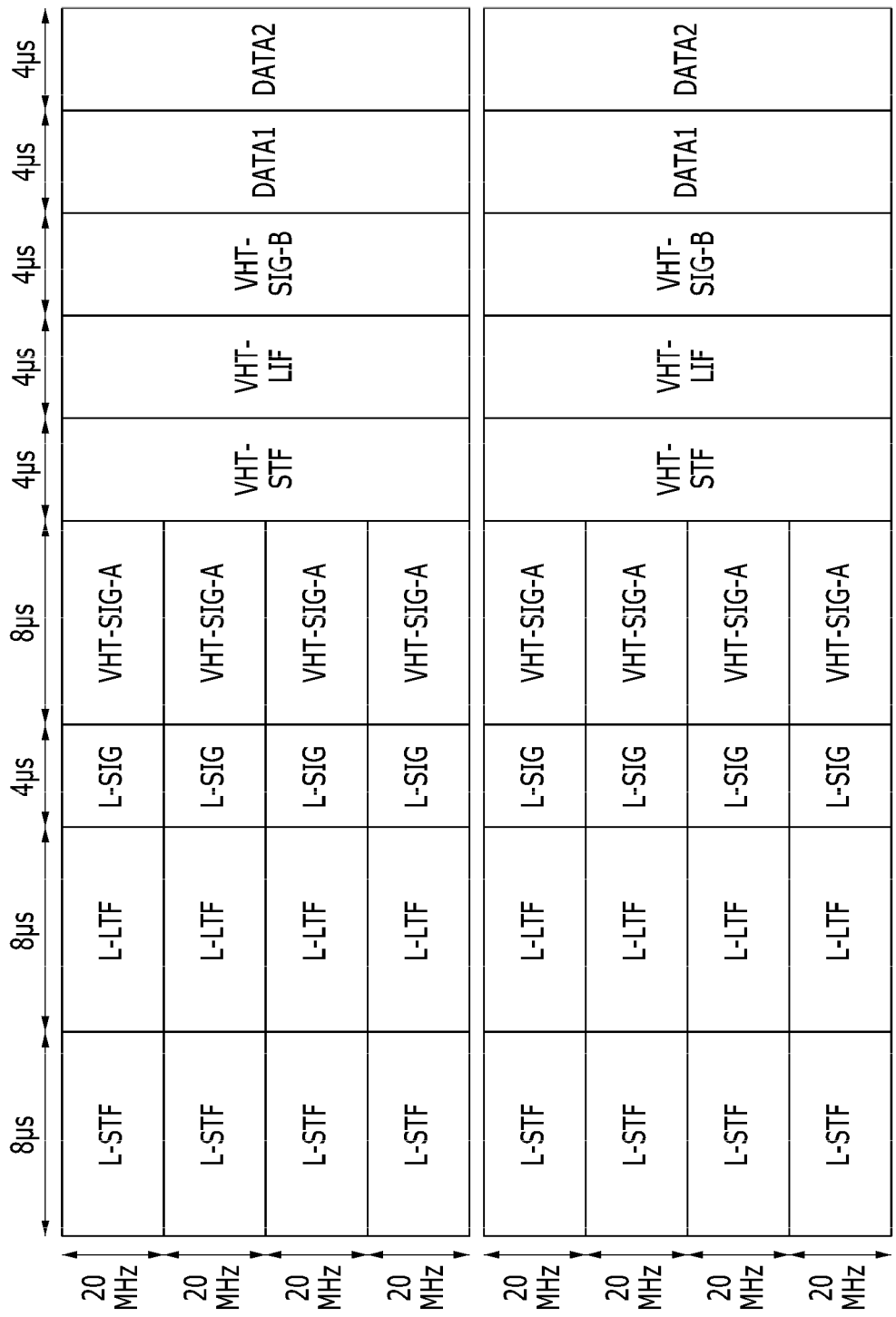
FIG. 14 schematically shows a frame format of a 160 MHz OFDM mode in a wireless communication network according to an embodiment.

FIG. 11 schematically shows a frame format of a 20 MHz OFDM mode in a wireless communication network according to an embodiment, FIG. 12 schematically shows a frame format of a 40 MHz OFDM mode in a wireless communication network according to an embodiment, FIG. 13 schematically shows a frame format of an 80 MHz OFDM mode in a wireless communication network according to an embodiment, and FIG. 14 schematically shows a frame format of a 160 MHz OFDM mode in a wireless communication network according to an embodiment.

As shown in FIG. 11 to FIG. 14, when an OFDM transmission is used in a wireless communication network according to an embodiment, a HE 20 MHz OFDM mode using a 20 MHz bandwidth, a HE 40 MHz OFDM mode using a 40 MHz bandwidth, a HE 80 MHz OFDM mode using an 80 MHz bandwidth, and a HE 160 MHz OFDM mode using a 160 MHz bandwidth may be supported similarly to the VHT WLAN.

Referring to FIG. 11, a frame of the HE 20 MHz OFDM mode includes a legacy preamble part, a HE preamble part, and a data field.

The legacy preamble part includes a legacy short training field (L-STF), a legacy long training field (L-LTF), and a legacy signal field (L-SIG). The HE preamble part includes a HE signal field (HE-SIG-A), a HE short training field (HE-STF), and a HE long training field (HE-LTF). The HE preamble part may further include an additional HE signal field (HE-SIG-B).

The HE-SIG-A follows the L-SIG and carries signaling information for a HE device. The HE-SIG-A includes two symbols. The length information of the L-SIG and the signaling information of the HE-SIG-A may be decoded based on the channel information estimated by the L-LTF. The HE-STF follows the HE-SIG-A and may be used for automatic gain control. The HE-STF corresponds to one symbolThe HE-LTF follows the HE-STF and may be used for MIMO channel estimation. The number of HE-LTFs may be determined based on the number of antennas used for the MIMO transmission, i.e., the number of space-time streams.

The HE-SIG-B follows the HE-LTF and carries additional signaling information. The HE-SIG-B corresponds to one symbol. In another embodiment, the HE-SIG-B may be positioned between the HE-SIG-A and the HE-STF.

Referring to FIG. 12, FIG. 13, and FIG. 14, each of a frame of the HE 40 MHz OFDM mode, a frame of HE 80 MHz OFDM mode, and a frame of HE 160 MHz OFDM mode includes a legacy preamble part, a HE preamble part, and a data field, like the frame of the HE 20 MHz OFDM mode.

The L-STF, the L-LTF, the L-SIG, and the HT-SIG-A are transmitted by being encoded by a basic bandwidth unit. The HT-STF, the HT-LTF, and the data field may be transmitted by being encoded by a 40 MHz bandwidth unit in the HE 40 MHz OFDM mode, and may be transmitted by being encoded by an 80 MHz bandwidth unit in the HE 80 MHz OFDM mode and the HE 160 MHz OFDM mode.

In this case, the same number of data tones and the same number of pilot tone as the VHT WLAN can be used in order to implement HE devices by using hardware of devices supporting the VHT WLAN.

That is, 48 data tones and 4 pilot tones may be used in the L-SIG and the HE-SIG-A. 52 data tones and 4 pilot tones may be used in the data field of the HE 20 MHz OFDM mode, 108 data tones and 6 pilot tones may be used in the data field of the HE 40 MHz OFDM mode, 234 data tones and 8 pilot tones may be used in the data field of the HE 80 MHz OFDM mode, and 234*2 data tones and 8*2 pilot tones may be used in the data field of the HE 160 MHz OFDM mode.

In some embodiments, a predetermined band may be divided into a plurality of subbands and the plurality of subbands may be allocated to a plurality of devices. A transmission scheme such as an orthogonal frequency-division multiple access (OFDMA) scheme may be used for a transmission using the plurality of subbands. Hereinafter, a frame format using the OFDMA scheme is described.

FIG. 15, FIG. 16, FIG. 17, FIG. 18, FIG. 19, FIG. 20, and FIG. 21 schematically show frame formats of a 20 MHz OFDMA mode in a wireless communication network according to an embodiment. Frames shown in FIG. 15 to FIG. 21 are PHY frames and may be PPDUs.

Referring to FIG. 15 to FIG. 21, a 20 MHz band may be divided into one or more subbands, i.e., one or more resource units in a HE 20 MHz OFDMA mode supporting the 20 MHz band.

A frame of the HE 20 MHz OFDMA mode includes a legacy preamble part, a HE preamble part, and a data field.

The legacy preamble part includes a legacy short training field (L-STF), a legacy long training field (L-LTF), and a legacy signal field (L-SIG). The HE preamble part includes a HE signal field (HE-SIG-A), a HE short training field (HE-STF), and a HE long training field (HE-LTF). The HE preamble part may further include an additional HE signal field (HE-SIG-B).

The L-STF, the L-LTF, the L-SIG, and the HT-SIG-A are not transmitted on each subband and are transmitted by being encoded by a basic bandwidth unit, i.e., the 20 MHz bandwidth unit. The data field is transmitted by being encoded by a subband unit, and the data field transmitted on each subband may include data for an allocated device.

In some embodiments, as shown in FIG. 15 to FIG. 21, the HE-STF, the HE-LTF, and the HE-SIG-B may be also transmitted by being encoded by the subband unit. In another embodiment, the HE-STF used for automatic gain control may be transmitted by being encoded by the 20 MHz bandwidth unit differently from an embodiment shown in FIG. 15 to FIG. 21. In yet another embodiment, when the HE-SIG-B is positioned between the HE-SIG-A and the HE-STF, the HE-SIG-B may be also transmitted by being encoded by the 20 MHz bandwidth unit.

In an embodiment, subcarrier spacing is shortened to increase a length of an OFDM symbol. Accordingly, an FFT having a larger size than an FFT used in the previous WLAN (i.e., a legacy WLAN, an HT WLAN, or a VHT WLAN) is used.

The subcarrier spacing that is applied to symbols of the legacy preamble part and the HE-SIG-A is equal to the subcarrier spacing of the previous WLAN, for backward compatibility with the previous WLAN. That is, an FFT having the same size as the previous WLAN is used. The FFT used in the previous WLAN may be a 64 point FFT on a 20 MHz basic bandwidth, wherein the subcarrier spacing used in the previous WLAN is 312.5 kHz. As described above, a length of symbol duration excluding a GI in each symbol of the legacy preamble part and the HE-SIG-A is 3.2 μs. The GI has 0.8 μs length in a case of ¼ CP and has 0.4 μs length in a case of ⅛ CP.

Subcarrier spacing (i.e., 78.125 kHz) that corresponds to ¼ of the subcarrier spacing in the legacy preamble part and HE-SIG-A may be used in the data field. For this, an FFT with four times as many points as the FFT of the legacy preamble part (hereinafter, a four times FFT), i.e., a 256 point FFT on the 20 MHz basic bandwidth, may be used. Accordingly, 256 subcarriers per symbol can be used on the 20 MHz basic bandwidth. In this case, a length of symbol duration excluding the GI from each symbol of the data field is 12.8 μs. Accordingly, the length of symbol duration excluding the GI from each symbol of the data field becomes four times of a length of symbol duration excluding the GI from each symbol of the legacy preamble part.

In one embodiment, the four times FFT of the legacy preamble part may be used in remaining fields excluding the HE-SIG-A from the HE preamble part. In another embodiment, an FFT having the same size as the FFT of the legacy preamble part may be used in the HE-STF of the HE preamble part. In yet another embodiment, the FFT having the same size as the FFT of the legacy preamble part may be used in the HE-STF and the HE-SIG-B of the HE preamble part.

As such, since the number of available subcarriers per symbol is increased when the four times FFT is used, a bandwidth that is narrower than the 20 MHz bandwidth can be used as a minimum resource unit. Hereinafter, resource units that can be used in a wireless communication network according to an embodiment are described with reference to FIG. 22 to FIG. 27.

Figure 22:
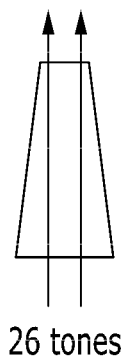
FIG. 22 shows a 26-tone resource unit in a wireless communication network according to an embodiment.
Figure 23:
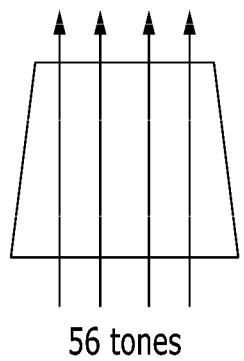
FIG. 23 shows a 56-toen resource unit in a wireless communication network according to an embodiment.
Figure 24:
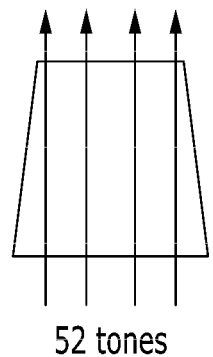
FIG. 24 shows a 52-tone resource unit in a wireless communication network according to an embodiment.
Figure 25:
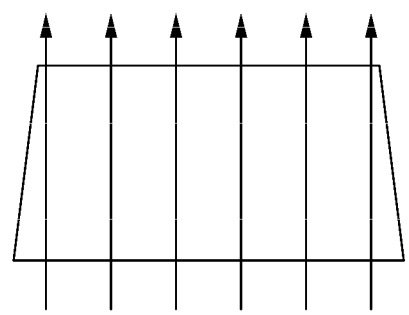
FIG. 25 shows 114-tone resource unit in a wireless communication network according to an embodiment.
Figure 26:
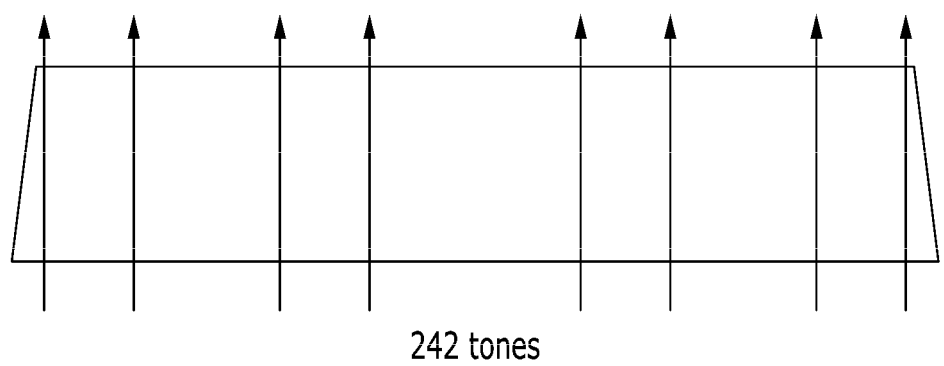
FIG. 26 shows a 242-tone resource unit in a wireless communication network according to an embodiment.
Figure 27:
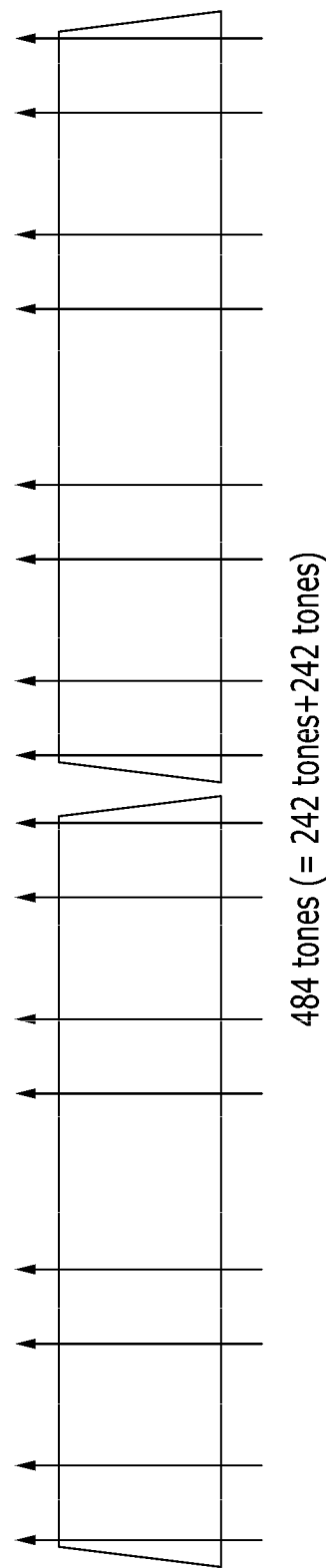
FIG. 27 shows a 484-tone resource unit in a wireless communication network according to an embodiment.
Figure 28:
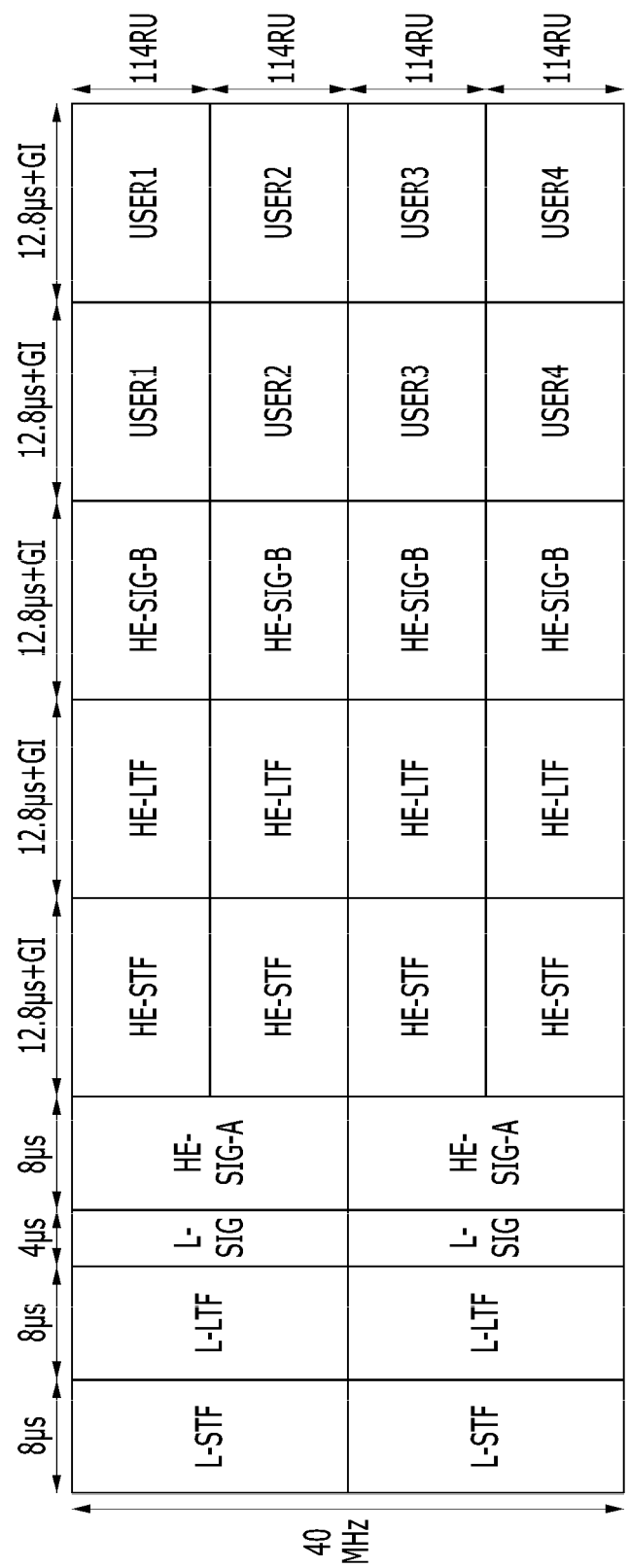
FIG. 28, FIG. 29, FIG. 30, FIG. 31, and FIG. 32 schematically show frame formats of a 40 MHz OFDMA mode in a wireless communication network according to an embodiment.

FIG. 22 shows a 26-tone resource unit in a wireless communication network according to an embodiment, FIG. 23 shows a 56-toen resource unit in a wireless communication network according to an embodiment, FIG. 24 shows a 52-tone resource unit in a wireless communication network according to an embodiment, FIG. 25 shows 114-tone resource unit in a wireless communication network according to an embodiment, FIG. 26 shows a 242-tone resource unit in a wireless communication network according to an embodiment, and FIG. 27 shows a 484-tone resource unit in a wireless communication network according to an embodiment.

Since the data field to which the four times FFT is applied can use 256 tones in a 20 MHz band, the maximum number of tones that be used in a 2.5 MHz band is 32. The 32 tones are equal to the number of tones in a 1 MHz mode of the IEEE standard 802.11ah. Accordingly, in an embodiment, a resource unit of the 2.5 MHz band uses 26 tones having 24 data tones and 2 pilot tones as shown in FIG. 22, in order to reuse hardware of device supporting the IEEE standard 802.11ah. Hereinafter, such resource unit is referred to as a "26-tone resource unit."

An embodiment may use the 26-tone resource unit as a minimum resource unit.

The maximum number of tones that the data field to which the four times FFT is applied can use in a 5 MHz band is 64. The 64 tones are equal to the number of tones in a VHT 20 MHz mode of the VHT WLAN. Accordingly, in an embodiment, a resource unit of the 5 MHz band uses 56 tones having 52 data tones and 4 pilot tones as shown in FIG. 23, in order to reuse hardware of device supporting the VHT WLAN. Hereinafter, such resource unit is referred to as a "56-tone resource unit."

Hardware of the device supporting the VHT WLAN can support 52 tones having 48 data tones and 4 pilot tones a legacy preamble part and a VHT-SIG-A of the VHT 20 MHz mode. Accordingly, in another embodiment, a resource unit of the 5 MHz band may use 52 tones having 48 data tones and 4 pilot tones as shown in FIG. 24. Hereinafter, such resource unit is referred to as a "52-tone resource unit."

In some embodiments, the 52-tone resource unit may correspond to two 26-tone resource units. In another embodiment, the 56-tone resource unit may correspond to two 26-tone resource units and four tones having null values.

The maximum number of tones that the data field to which the four times FFT is applied can use in a 10 MHz band is 128. The 128 tones are equal to the number of tones in a VHT 40 MHz mode of the VHT WLAN. Accordingly, in an embodiment, a resource unit of the 10 MHz band uses 114 tones having 108 data tones and 6 pilot tones as shown in FIG. 25, in order to reuse hardware of device supporting the VHT WLAN. Hereinafter, such resource unit is referred to as a "114-tone resource unit."

In some embodiment, the 114-tone resource unit may correspond to four 26-tone resource units and ten tones having null values.

The maximum number of tones that the data field to which the four times FFT is applied can use in a 20 MHz band is 256. The 256 tones are equal to the number of tones in a VHT 80 MHz mode of the VHT WLAN. Accordingly, in an embodiment, a resource unit of the 20 MHz band uses 242 tones having 234 data tones and 8 pilot tones as shown in FIG. 26, in order to reuse hardware of device supporting the VHT WLAN. Hereinafter, such resource unit is referred to as a "242-tone resource unit."

In some embodiments, the 242-tone resource unit may correspond to eight 26-tone resource units and 34 tones having null values. In another embodiment, the 242-tone resource unit may correspond to nine 26-tone resource units and eight tone having null values.

The maximum number of tones that the data field to which the four times FFT is applied can use in a 40 MHz band is 512. The 512 tones are equal to the number of tones in a VHT 160 MHz mode of the VHT WLAN. Accordingly, in an embodiment, a resource unit of the 40 MHz band uses 242*2 (=484) tones having 234*2 (=468) data tones and 8*2 (=16) pilot tones as shown in FIG. 27, in order to reuse hardware of device supporting the VHT WLAN. Hereinafter, such resource unit is referred to as a "484-tone resource unit."

Referring to FIG. 15 again, the 256 tones that can be used in the 20 MHz band may be divided into four 52-tone resource units 52RU and the four 52-tone resource units 52RU may allocated to four users (user 1, user 2, user 3, and user 4), i.e., four devices, respectively. Accordingly, a device for each user can transmit or receive data using the 48 data tones and the 4 pilot tones of its allocated 52-tone resource unit in each symbol of the data field. In some embodiment, null values may be transmitted through tones excluding 208 tones used in the four 52-tone resource units from the 256 tones.

Since the legacy preamble part and the VHT-SIG-A of the VHT 20 MHz mode uses the 52 tones having the 48 data tones and the 4 pilot tones, a transmitting device can transmit data by encoding and interleaving the data in the same way as the VHT 20 MHz mode for each 52-tone resource unit, for example, in the downlink transmission. Further, a receiving device for each user can deinterleave and decode the data transmitted on the 52-tone resource unit in the same way as the VHT 20 MHz mode.

In another embodiment, the 256 tones that can be used in the 20 MHz band may be divided into four 56-tone resource units and the four 56-tone resource units may allocated to four users, i.e., four devices, respectively. Null values may be transmitted through tones excluding 224 tones used in the four 56-tone resource units from the 256 tones.

Since the data field of the VHT 20 MHz mode uses the 56 tones having the 52 data tones and the 4 pilot tones, the transmitting device can transmit data by encoding and interleaving the data in the same way as the VHT 20 MHz mode for each 56-tone resource unit, for example, in the downlink transmission. Further, the receiving device for each user can deinterleave and decode the data transmitted on the 56-tone resource unit in the same way as the VHT 20 MHz mode.

Figure 15:
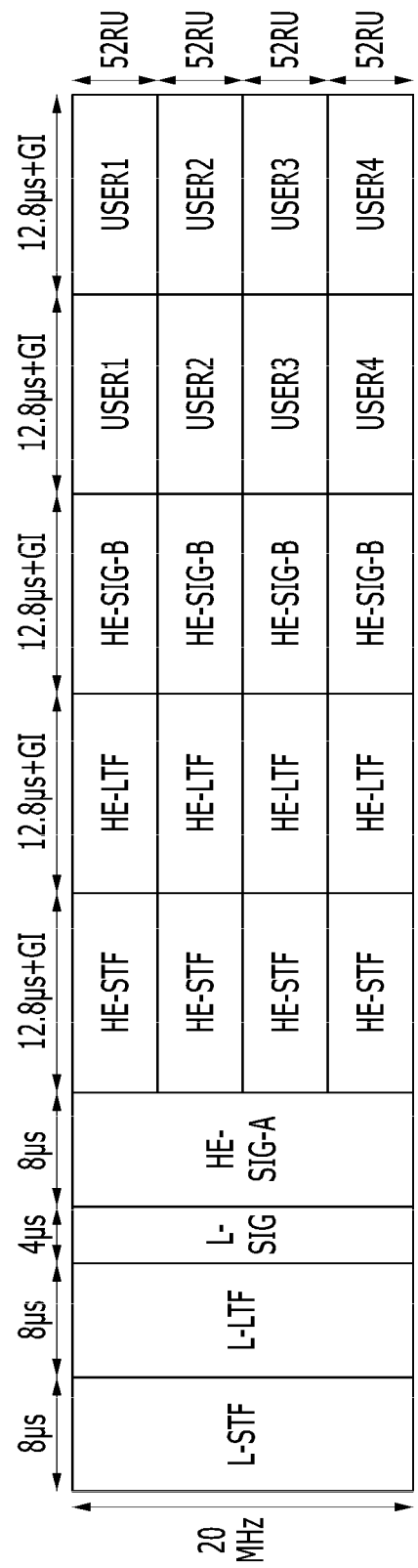
FIG. 15, FIG. 16, FIG. 17, FIG. 18, FIG. 19, FIG. 20, and FIG. 21 schematically show frame formats of a 20 MHz OFDMA mode in a wireless communication network according to an embodiment.

Accordingly, hardware of the devices supporting the VHT WLAN can be reused such that the transmitting device and the receiving device can transmit and receive the frame shown in FIG. 15.

Figure 16:
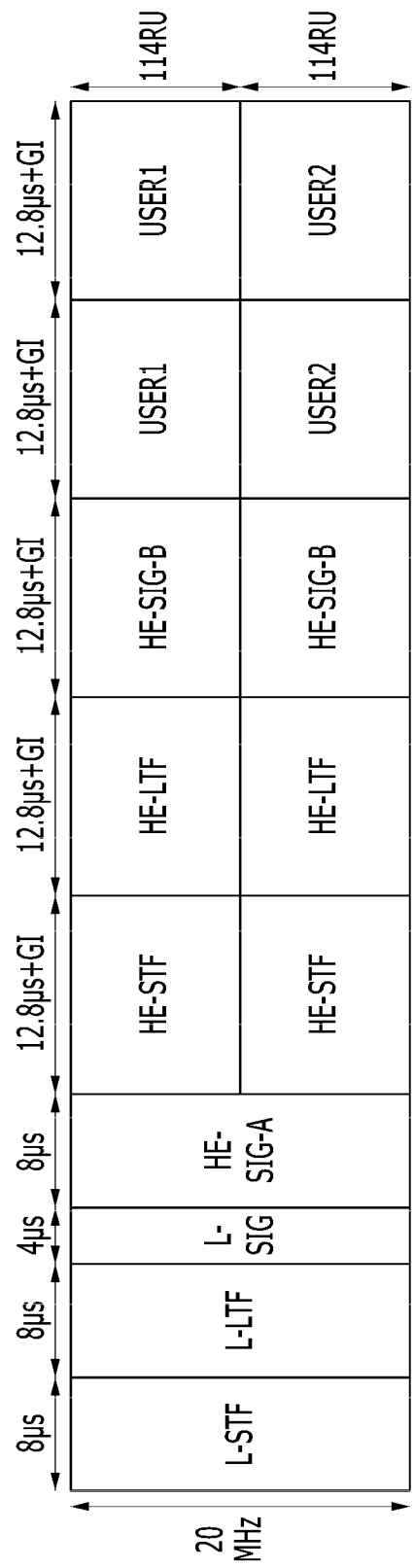

Referring to FIG. 16, the 256 tones that can be used in the 20 MHz band may be divided into two 114-tone resource units 114RU, and the two 114-tone resource units 114RU may be allocated to two users (user 1 and user 2) respectively. Accordingly, a device for each user can transmit or receive data using the 108 data tones and the 6 pilot tones of its allocated 114-tone resource unit in each symbol of the data field. In some embodiment, null values may be transmitted through tones excluding 228 tones used in the two 114-tone resource units from the 256 tones.

Since the VHT 40 MHz mode uses the 114 tones having the 108 data tones and the 6 pilot tones, a transmitting device can transmit data by encoding and interleaving the data in the same way as the VHT 40 MHz mode for each 114-tone resource unit, for example, in the downlink transmission. Further, a receiving device for each user can deinterleave and decode the data transmitted on the 114-tone resource unit in the same way as the VHT 40 MHz mode. Accordingly, hardware of the devices supporting the VHT WLAN can be reused such that the transmitting device and the receiving device can transmit and receive the frame shown in FIG. 16.

When two guard tones are provided between the two 56-tone resource units, the two 56-tone resource units and the two guard tones between the two 56-tone resource units may correspond to the 114-tone resource unit. Therefore, when two guard tones are provided between the two 52-tone resource units, the two 52-tone resource units and the two guard tones between the two 52-tone resource units may correspond to 106 tones. Four tones may be used as pilot tones among the 106 tones in order to increase the number of data tones. Hereinafter, such resource unit is referred to as a "106-tone resource unit."

Accordingly, in another embodiment, the 256 tones that can be used in the 20 MHz band may be divided into two 106-tone resource units, and the two 106-tone resource units may be allocated to two users respectively. The 106-tone resource unit uses the 106 tones having 102 data tones and 4 pilot tones. Null values may be transmitted through tones excluding 212 tones used in the two 106-tone resource units from the 256 tones. In this case, new hardware may be used for supporting the 106 tones.

Figure 17:
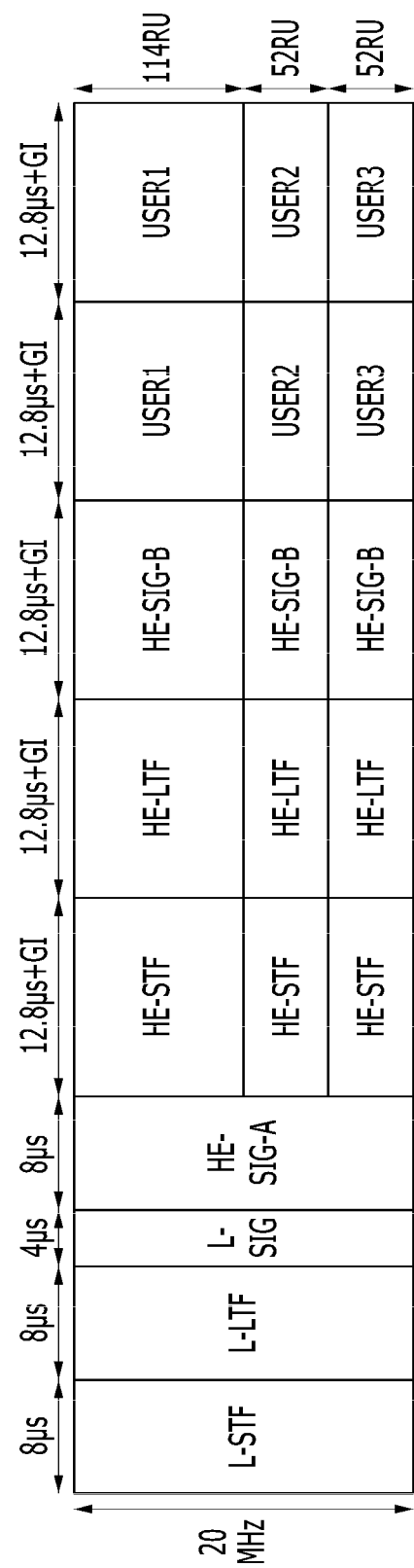

Referring to FIG. 17, the 20 MHz band may be divided into one 114-tone resource unit 114RU and two 52-tone resource units 52RU, and the 114-tone resource unit 114RU and the two 52-tone resource units 52RU may allocated to three users (user 1, user 2, and user 3), respectively. Accordingly, a device for user 1 can transmit or receive data using the 108 data tones and the 6 pilot tones in each symbol of the data field. A device for user 2 or 3 can transmit or receive data using the 48 data tones and the 4 pilot tones in each symbol of the data field. In some embodiment, null values may be transmitted through tones excluding 218 tones used in the 114-tone resource unit and the two 52-tone resource units from the 256 tones.

Since the VHT 20 MHz mode uses the 52 tones and the VHT 40 MHz mode uses the 114 tones, a transmitting device can transmit data by encoding and interleaving the data in the same way as the VHT 40 MHz mode for the 114-tone resource unit and transmit data by encoding and interleaving the data in the same way as the VHT 20 MHz mode for each 52-tone resource unit, for example, in the downlink transmission. Further, a receiving device for user 1 can deinterleave and decode the data transmitted on the 114-tone resource unit in the same way as the VHT 40 MHz mode, and a receiving device for user 2 or 3 can deinterleave and decode the data transmitted on the 52-tone resource unit in the same way as the VHT 20 MHz mode. Accordingly, hardware of the devices supporting the VHT WLAN can be reused such that the transmitting device and the receiving device can transmit and receive the frame shown in FIG. 17.

In another embodiment, the 56-tone resource unit may be used instead of the 52-tone resource unit.

In yet another embodiment, the 106-tone resource unit may be used instead of the 114-tone resource unit.

Figure 18:
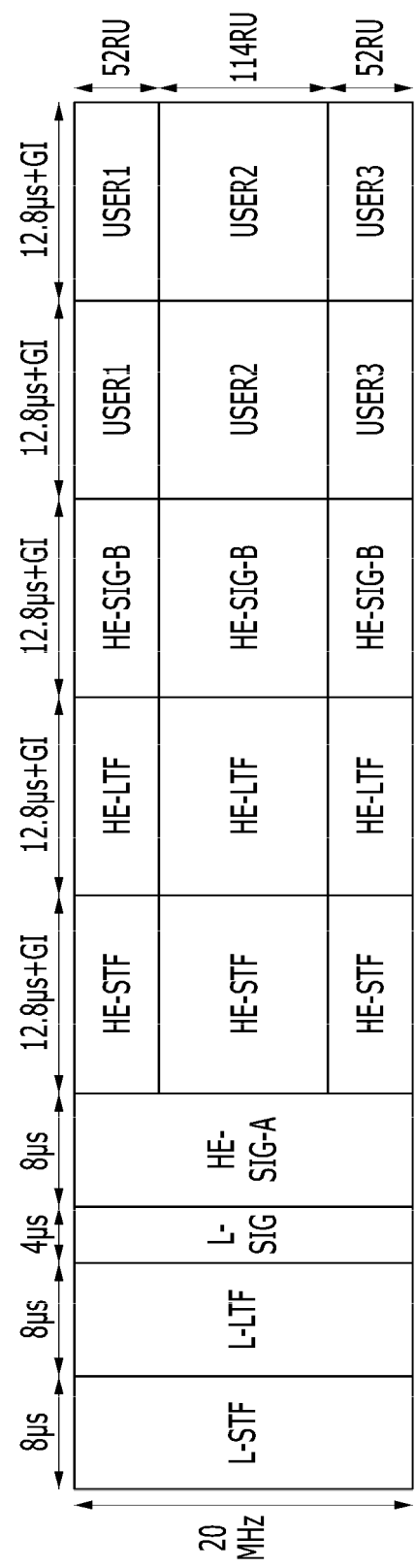
Figure 19:
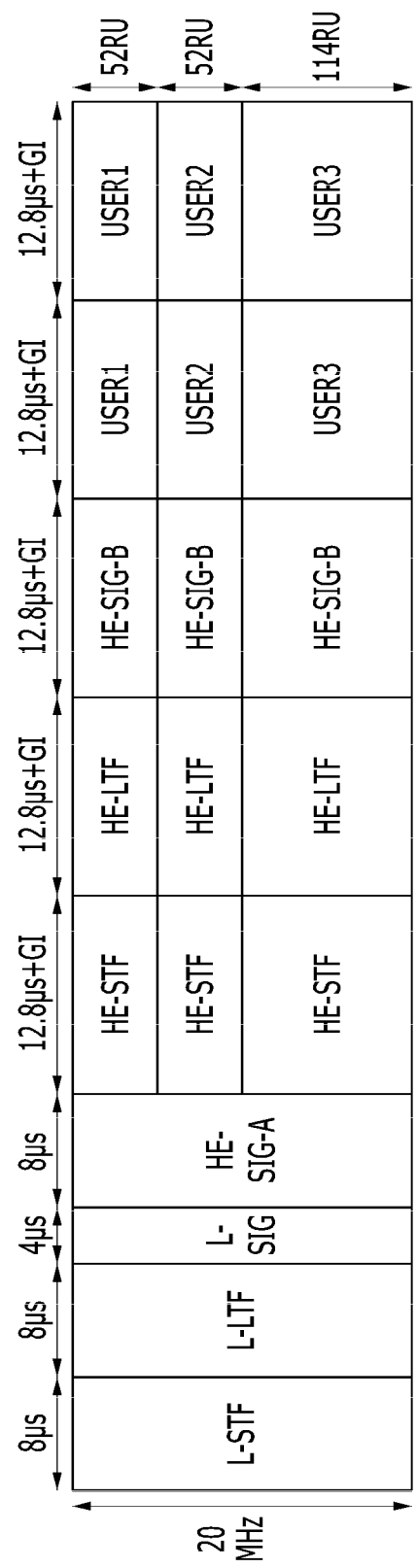

While it has been shown in FIG. 17 that the 114-tone resource unit is allocated to user 1, the 114-tone resource unit may be allocated to user 2 as shown in FIG. 18, or may be allocated to user 3 as shown in FIG. 19.

Figure 20:
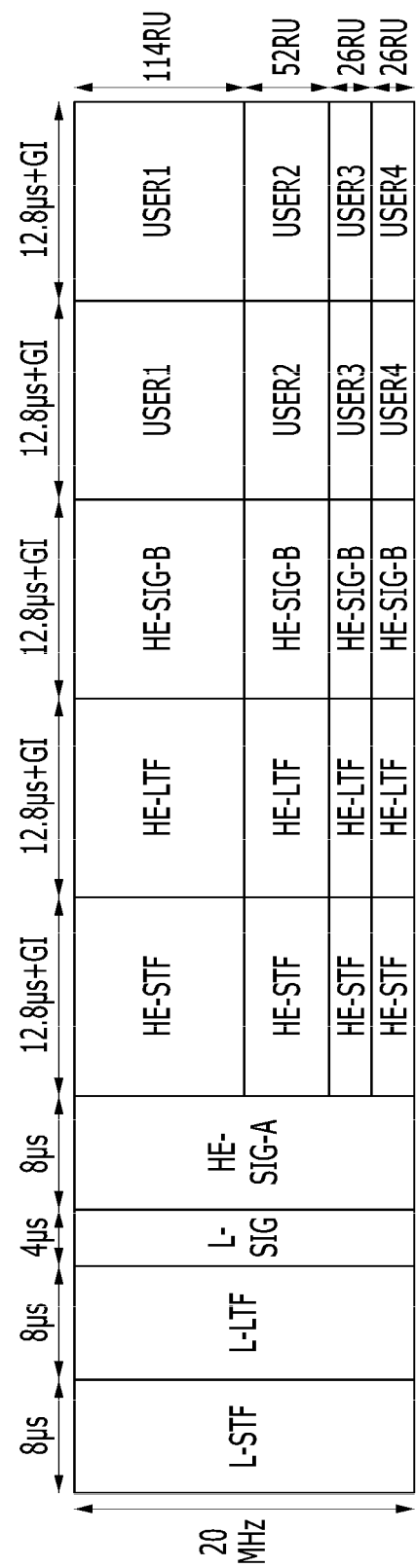

Referring to FIG. 20, the 20 MHz band may be divided into one 114-tone resource unit 114RU, one 52-tone resource unit 52RU, and two 26-tone resource units 26RU, and the 114-tone resource unit 114RU, the 52-tone resource unit 52RU, and the two 26-tone resource units 26RU may be allocated to four users (user 1, user 2, user 3, and user 4), respectively. Accordingly, a device for user 1 can transmit or receive data using the 108 data tones and the 6 pilot tones in each symbol of the data field. A device for user 2 can transmit or receive data using the 48 data tones and the 4 pilot tones in each symbol of the data field. A device for user 3 or 4 can transmit or receive data using the 24 data tones and the 2 pilot tones in each symbol of the data field. In some embodiment, null values may be transmitted through tones excluding 218 tones used in the 114-tone resource unit, the 52-tone resource unit, and the two 26-tone resource units from the 256 tones.

Since the VHT 20 MHz mode uses the 52 tones, the VHT 40 MHz mode uses the 114 tones, and the 1 MHz mode of the IEEE standard 802.11ah uses the 26 tones, a transmitting device can transmit data by encoding and interleaving the data in the same way as the VHT 40 MHz mode for the 114-tone resource unit, transmit data by encoding and interleaving the data in the same way as the VHT 20 MHz mode for the 52-tone resource unit, and transmit data by encoding and interleaving the data in the same way as the 1 MHz mode for each 26-tone resource unit, for example, in the downlink transmission. Further, a receiving device for user 1 can deinterleave and decode the data transmitted on the 114-tone resource unit in the same way as the VHT 40 MHz mode, and a receiving device for user 2 can deinterleave and decode the data transmitted on the 52-tone resource unit in the same way as the VHT 20 MHz mode. A receiving device for user 3 or 4 can deinterleave and decode the data transmitted on the 26-tone resource unit in the same way as the 1 MHz mode. Accordingly, hardware of the devices supporting the VHT WLAN and the IEEE standard 802.11ah can be reused such that the transmitting device and the receiving device can transmit and receive the frame shown in FIG. 20.

In another embodiment, the 56-tone resource unit may be used instead of the 52-tone resource unit.

In yet another embodiment, the 106-tone resource unit may be used instead of the 114-tone resource unit.

While it has been shown in FIG. 20 that the 114-tone resource unit is allocated to user 1, the 52-tone resource unit is allocated to user 2, and the 26-tone resource units are allocated to users 3 and 4, a different combination of these resource units may allocated to user 1, user 2, user 3, and user 4.

Figure 21:
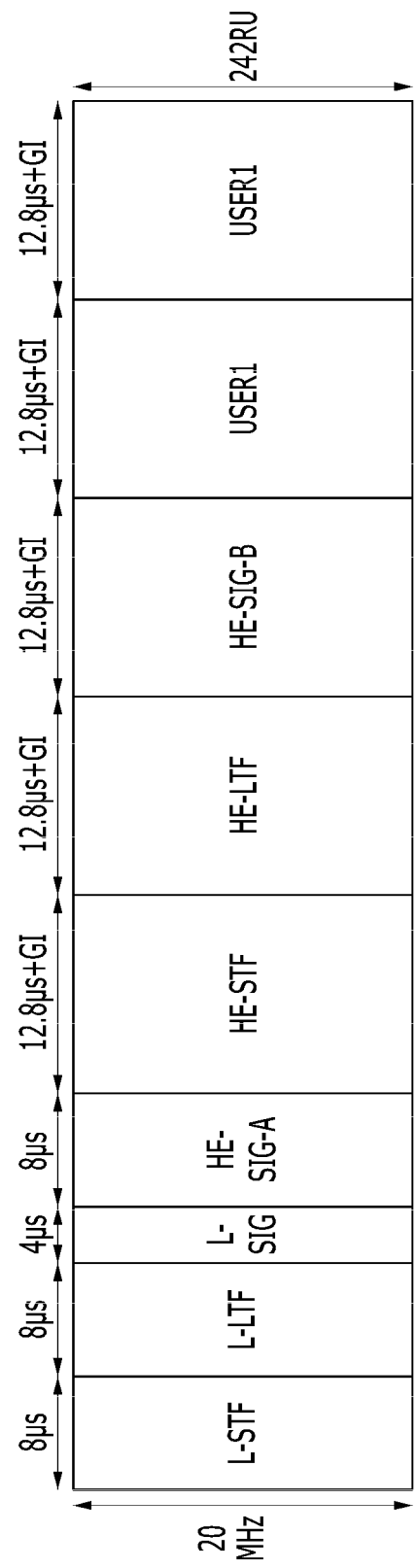

Referring to FIG. 21, a 242-tone resource unit 242RU may be allocated to a user (user 1) among 256 tones of the 20 MHz band. Accordingly, a device for user 1 can transmit or receive data using the 234 data tones and the 8 pilot tones in each symbol of the data field. In some embodiment, null values may be transmitted through tones excluding 242 tones used in the 242-tone resource unit from the 256 tones.

Since the VHT 80 MHz mode uses the 242 tones having the 234 data tones and the 8 pilot tones, a transmitting device can transmit data by encoding and interleaving the data in the same way as the VHT 80 MHz mode for the 242-tone resource unit, for example, in the downlink transmission. Further, a receiving device can deinterleave and decode the data transmitted on the 242-tone resource unit in the same way as the VHT 80 MHz mode. Accordingly, hardware of the devices supporting the VHT WLAN can be reused such that the transmitting device and the receiving device can transmit and receive the frame shown in FIG. 21.

FIG. 28, FIG. 29, FIG. 30, FIG. 31, and FIG. 32 schematically show frame formats of a 40 MHz OFDMA mode in a wireless communication network according to an embodiment.

Referring to FIG. 28 to FIG. 32, a 40 MHz band may be divided into one or more subbands, i.e., one or more resource units in a HE 40 MHz OFDMA mode supporting the 40 MHz band.

A frame of the HE 40 MHz OFDMA mode includes a legacy preamble part, a HE preamble part, and a data field.

The legacy preamble part includes a legacy short training field (L-STF), a legacy long training field (L-LTF), and a legacy signal field (L-SIG). The HE preamble part includes a HE signal field (HE-SIG-A), a HE short training field (HE-STF), and a HE long training field (HE-LTF). The HE preamble part may further include an additional HE signal field (HE-SIG-B).

The L-STF, the L-LTF, the L-SIG, and the HT-SIG-A are not transmitted on each subband and are transmitted by being encoded by a basic bandwidth unit, i.e., the 20 MHz bandwidth unit. The legacy preamble part and the HE-SIG-A of one 20 MHz bandwidth may be duplicated to another 20 MHz bandwidth. The data field is transmitted by being encoded by a subband unit, and the data field transmitted on each subband may include data for an allocated device.

In some embodiments, as shown in FIG. 28 to FIG. 32, the HE-STF, the HE-LTF, and the HE-SIG-B may be also transmitted by being encoded by the subband unit. In another embodiment, the HE-STF used for automatic gain control may be transmitted by being encoded by the 20 MHz bandwidth unit differently from an embodiment shown in FIG. 28 to FIG. 32. In yet another embodiment, when the HE-SIG-B is positioned between the HE-SIG-A and the HE-STF, the HE-SIG-B may be also transmitted by being encoded by the 20 MHz bandwidth unit.

As described with reference to FIG. 15 to FIG. 21, the data field may use subcarrier spacing (i.e., 78.125 kHz) that corresponds to ¼ of the subcarrier spacing in the legacy preamble part. For this, an FFT with four times as many points as the FFT of the legacy preamble part (hereinafter, a four times FFT), i.e., a 256 point FFT on the 20 MHz basic bandwidth, may be used. In one embodiment, the four times FFT of the legacy preamble part may be used in remaining fields excluding the HE-SIG-A from the HE preamble part as shown in FIG. 28 to FIG. 32. In another embodiment, an FFT having the same size as the FFT of the legacy preamble part may be used in the HE-STF of the HE preamble part. In yet another embodiment, the FFT having the same size as the FFT of the legacy preamble part may be used in the HE-STF and the HE-SIG-B of the HE preamble part.

Referring to FIG. 28 again, the 512 tones that can be used in the 40 MHz band may be divided into four 114-tone resource units 114RU, and the four 114-tone resource units 114RU may be allocated to four users (user 1, user 2, user 3, and user 4), respectively. Accordingly, a device for each user can transmit or receive data using the 108 data tones and the 6 pilot tones in each symbol of the data field. In some embodiment, null values may be transmitted through tones excluding 456 tones used in the four 114-tone resource units from the 512 tones.

Since the VHT 40 MHz mode uses the 114 tones, a transmitting device can transmit data by encoding and interleaving the data in the same way as the VHT 40 MHz mode for each 114-tone resource unit, for example, in the downlink transmission. Further, a receiving device for each user can deinterleave and decode the data transmitted on the 114-tone resource unit in the same way as the VHT 40 MHz mode. Accordingly, hardware of the devices supporting the VHT WLAN can be reused such that the transmitting device and the receiving device can transmit and receive the frame shown in FIG. 28.

In another embodiment, the 512 tones that can be used in the 40 MHz band may be divided into four 106-tone resource units, and the four 106-tone resource units 114RU may be allocated to the four users, respectively.

Figure 29:
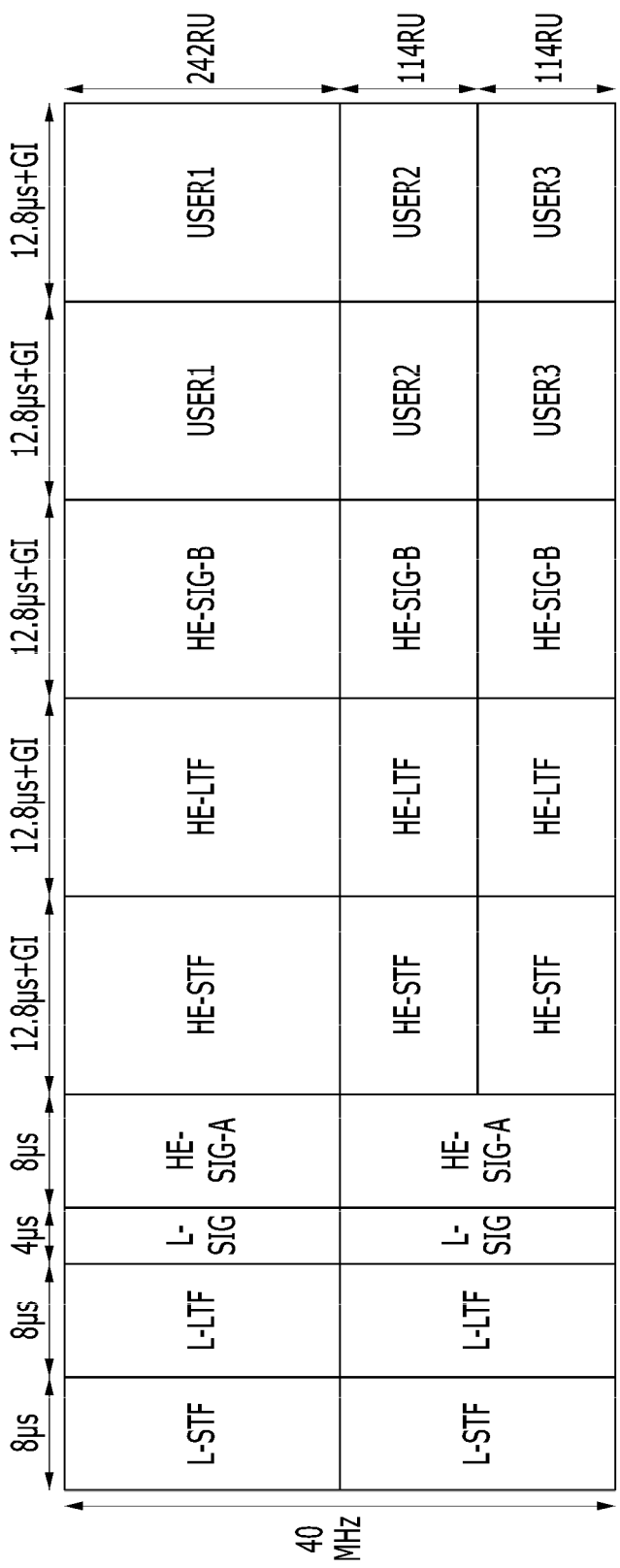

Referring to FIG. 29, the 40 MHz band may be divided into one 242-tone resource unit 242RU and two 114-tone resource units 114RU, and the 242-tone resource unit 242RU and the two 114-tone resource units 114RU may be allocated to three users (user 1, user 2, and user 3), respectively. Accordingly, a device for user 1 can transmit or receive data using the 234 data tones and the 8 pilot tones in each symbol of the data field. A device for user 2 or 3 can transmit or receive data using the 108 data tones and the 6 pilot tones in each symbol of the data field. In some embodiment, null values may be transmitted through tones excluding 470 tones used in the 242-tone resource unit and the two 114-tone resource units from the 256 tones.

Since the VHT 40 MHz mode uses the 114 tones and the VHT 80 MHz mode uses the 242 tones, a transmitting device can transmit data by encoding and interleaving the data in the same way as the VHT 40 MHz mode for the 114-tone resource unit and transmit data by encoding and interleaving the data in the same way as the VHT 80 MHz mode for each 242-tone resource unit, for example, in the downlink transmission. Further, a receiving device for user 1 can deinterleave and decode the data transmitted on the 242-tone resource unit in the same way as the VHT 80 MHz mode, and a receiving device for user 2 or 3 can deinterleave and decode the data transmitted on the 114-tone resource unit in the same way as the VHT 40 MHz mode. Accordingly, hardware of the devices supporting the VHT WLAN can be reused such that the transmitting device and the receiving device can transmit and receive the frame shown in FIG. 29.

In another embodiment, the 106-tone resource unit may be used instead of the 114-tone resource unit.

While it has been shown in FIG. 29 that the 242-tone resource unit is allocated to user 1, the 242-tone resource unit may be allocated to user 2 or user 3.

Figure 30:
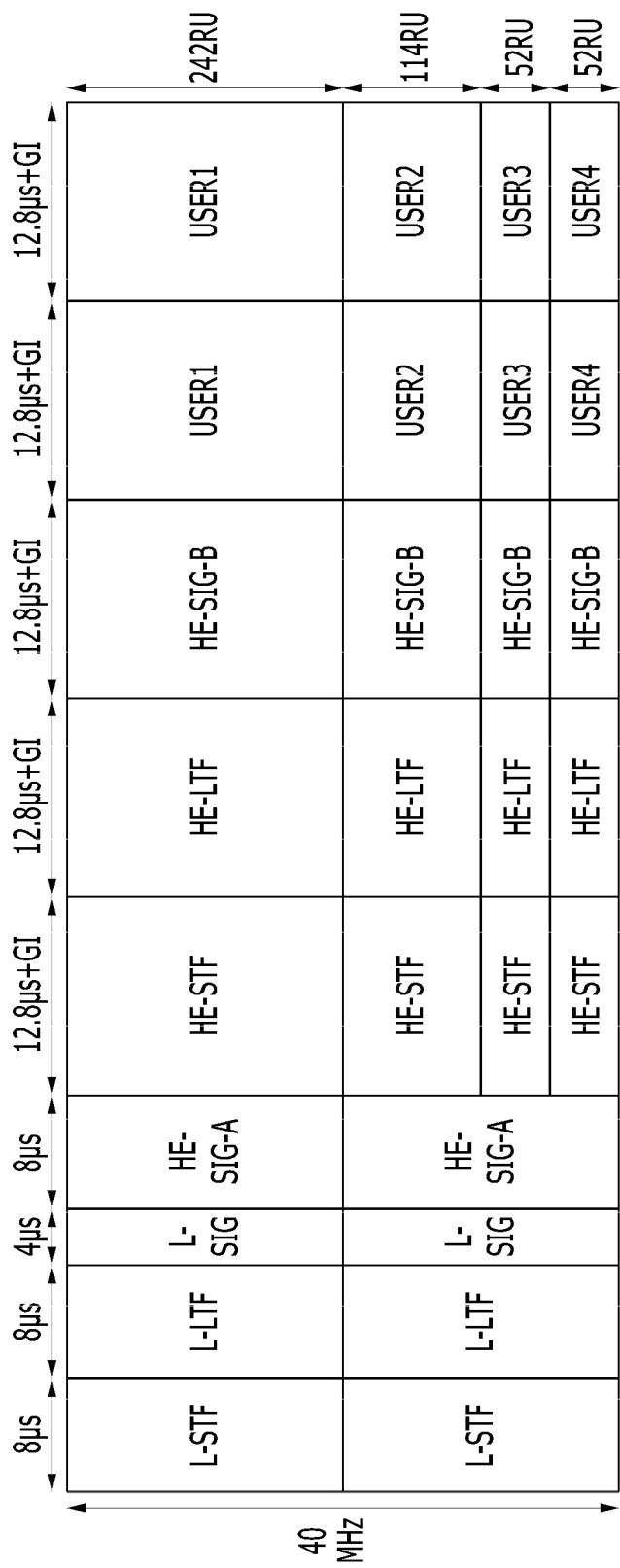

Referring to FIG. 30, the 40 MHz band may be divided into one 242-tone resource unit 242RU, one 114-tone resource unit 114RU, and two 52-tone resource units 52RU, and the 242-tone resource unit 242RU, the 114-tone resource unit 114RU, and the two 52-tone resource units 52RU may be allocated to four users (user 1, user 2, user 3, and user 4), respectively. Accordingly, a device for user 1 can transmit or receive data using the 234 data tones and the 8 pilot tones in each symbol of the data field. A device for user 2 can transmit or receive data using the 108 data tones and the 6 pilot tones in each symbol of the data field. A device for user 3 or 4 can transmit or receive data using the 48 data tones and the 4 pilot tones in each symbol of the data field. In some embodiment, null values may be transmitted through tones excluding 410 tones used in the 242-tone resource unit, the 114-tone resource unit, and the two 52-tone resource units from the 512 tones.

Since the VHT 20 MHz mode uses the 52 tones, the VHT 40 MHz mode uses the 114 tones, and the VHT 80 MHz mode uses the 242 tones, a transmitting device can transmit data by encoding and interleaving the data in the same way as the VHT 80 MHz mode for the 242-tone resource unit, transmit data by encoding and interleaving the data in the same way as the VHT 40 MHz mode for the 114-tone resource unit, and transmit data by encoding and interleaving the data in the same way as the VHT 20 MHz mode for each 52-tone resource unit, for example, in the downlink transmission. Further, a receiving device for user 1 can deinterleave and decode the data transmitted on the 242-tone resource unit in the same way as the VHT 80 MHz mode, and a receiving device for user 2 can deinterleave and decode the data transmitted on the 114-tone resource unit in the same way as the VHT 40 MHz mode. A receiving device for user 3 or 4 can deinterleave and decode the data transmitted on the 52-tone resource unit in the same way as the VHT 20 MHz mode. Accordingly, hardware of the devices supporting the VHT WLAN can be reused such that the transmitting device and the receiving device can transmit and receive the frame shown in FIG. 30.

In another embodiment, the 56-tone resource unit may be used instead of the 52-tone resource unit.

In yet another embodiment, the 106-tone resource unit may be used instead of the 114-tone resource unit.

While it has been shown in FIG. 30 that the 242-tone resource unit is allocated to user 1, the 114-tone resource unit is allocated to user 2, and the 52-tone resource units are allocated to users 3 and 4, a different combination of these resource units may allocated to user 1, user 2, user 3, and user 4.

Figure 31:
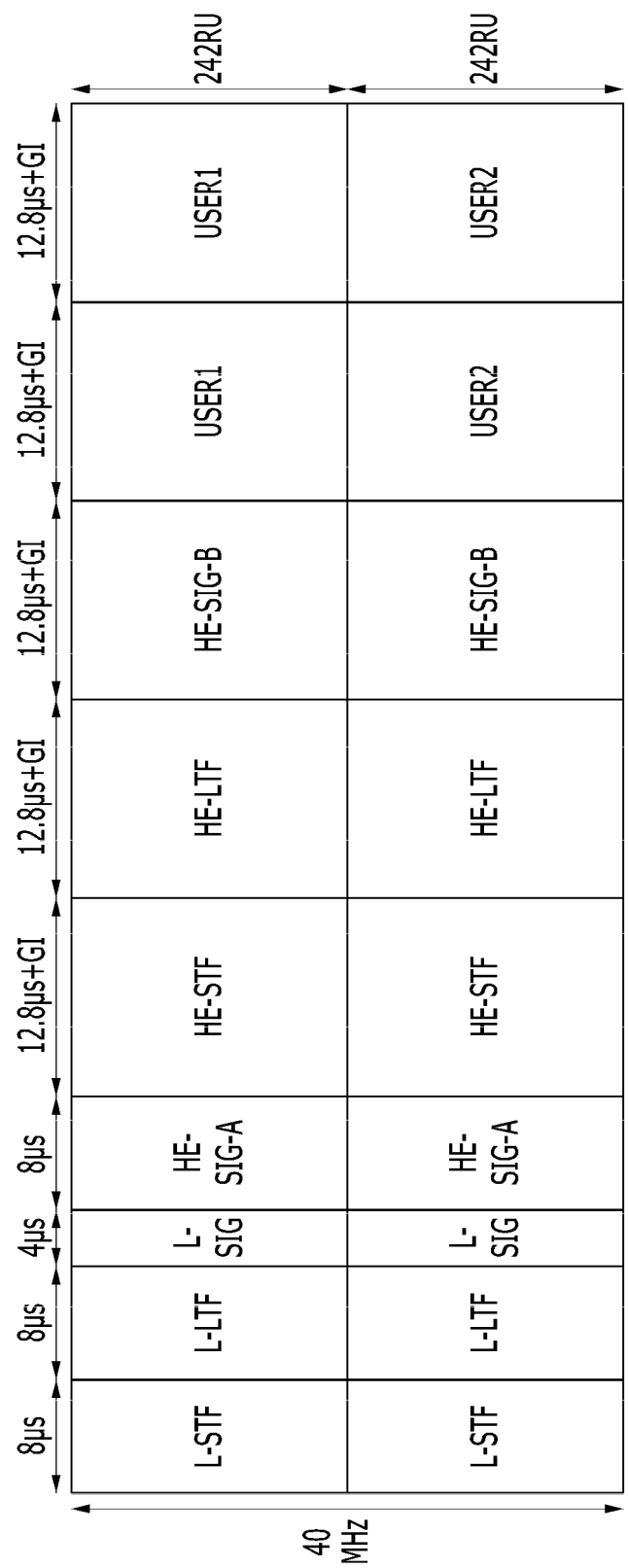

Referring to FIG. 31, the 40 MHz band may be divided into two 242-tone resource units 242RU, and the two 242-tone resource units 242RU may be allocated to two users (user 1 and user 2), respectively. Accordingly, a device user 1 or 2 can transmit or receive data using the 234 data tones and the 8 pilot tones in each symbol of the data field. In some embodiment, null values may be transmitted through tones excluding 484 tones used in the two 242-tone resource units from the 512 tones.

Since the VHT 80 MHz mode uses the 242 tones, a transmitting device can transmit data by encoding and interleaving the data in the same way as the VHT 80 MHz mode for the 242-tone resource unit, for example, in the downlink transmission. Further, a receiving device for user 1 or 2 can deinterleave and decode the data transmitted on the 242-tone resource unit in the same way as the VHT 80 MHz mode. Accordingly, hardware of the devices supporting the VHT WLAN can be reused such that the transmitting device and the receiving device can transmit and receive the frame shown in FIG. 31.

Figure 32:
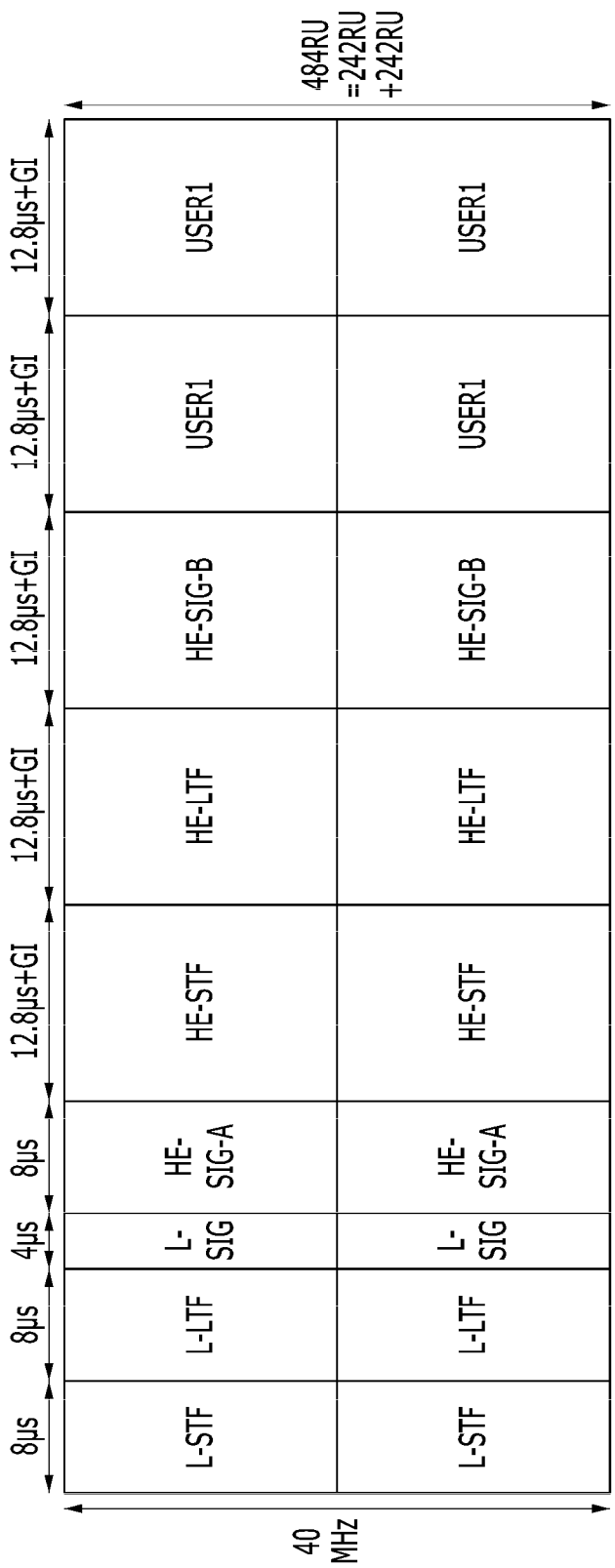
Figure 33:
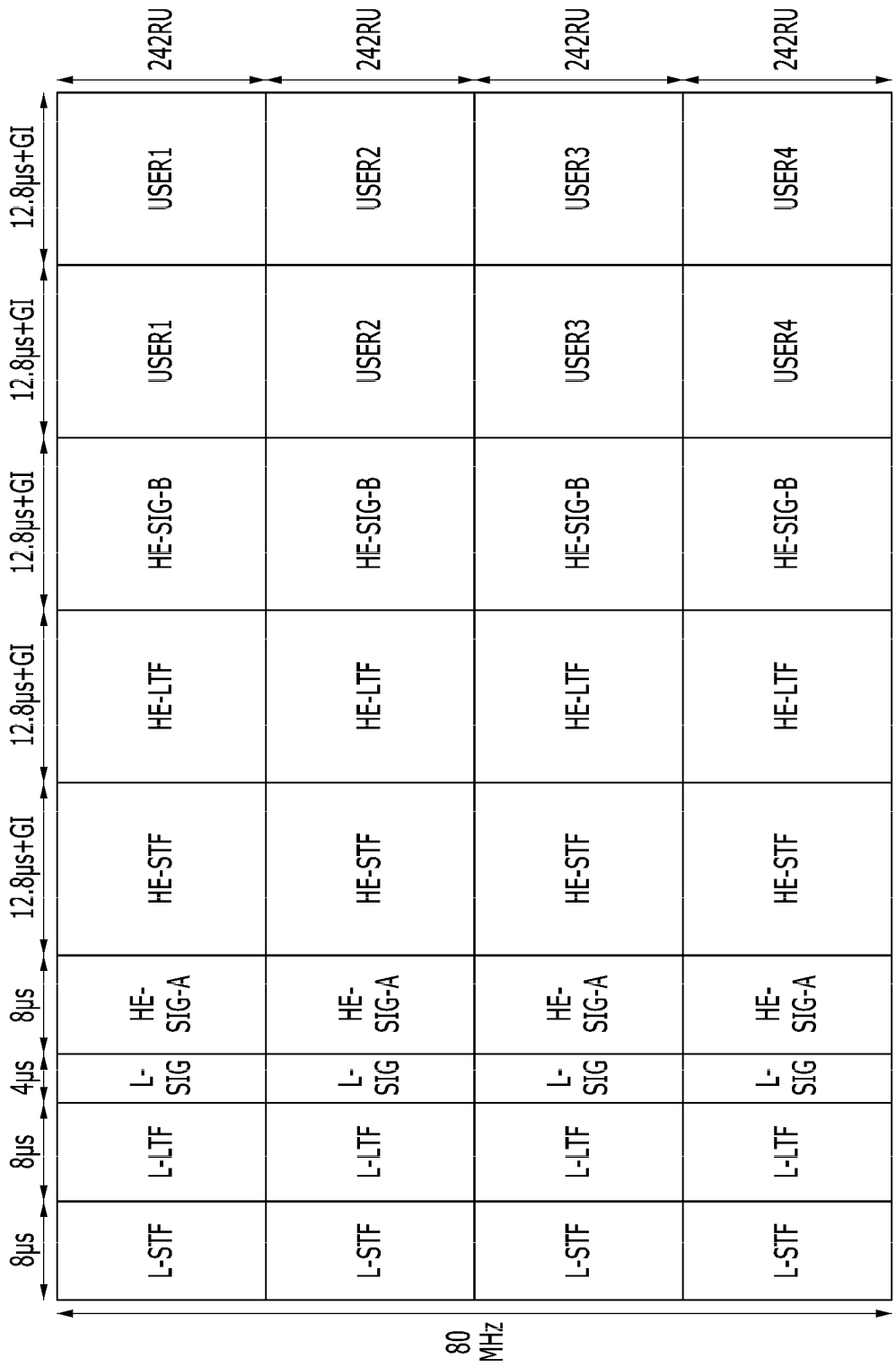
FIG. 33, FIG. 34, FIG. 35, and FIG. 36 schematically show frame formats of an 80 MHz OFDMA mode in a wireless communication network according to an embodiment.
Figure 34:
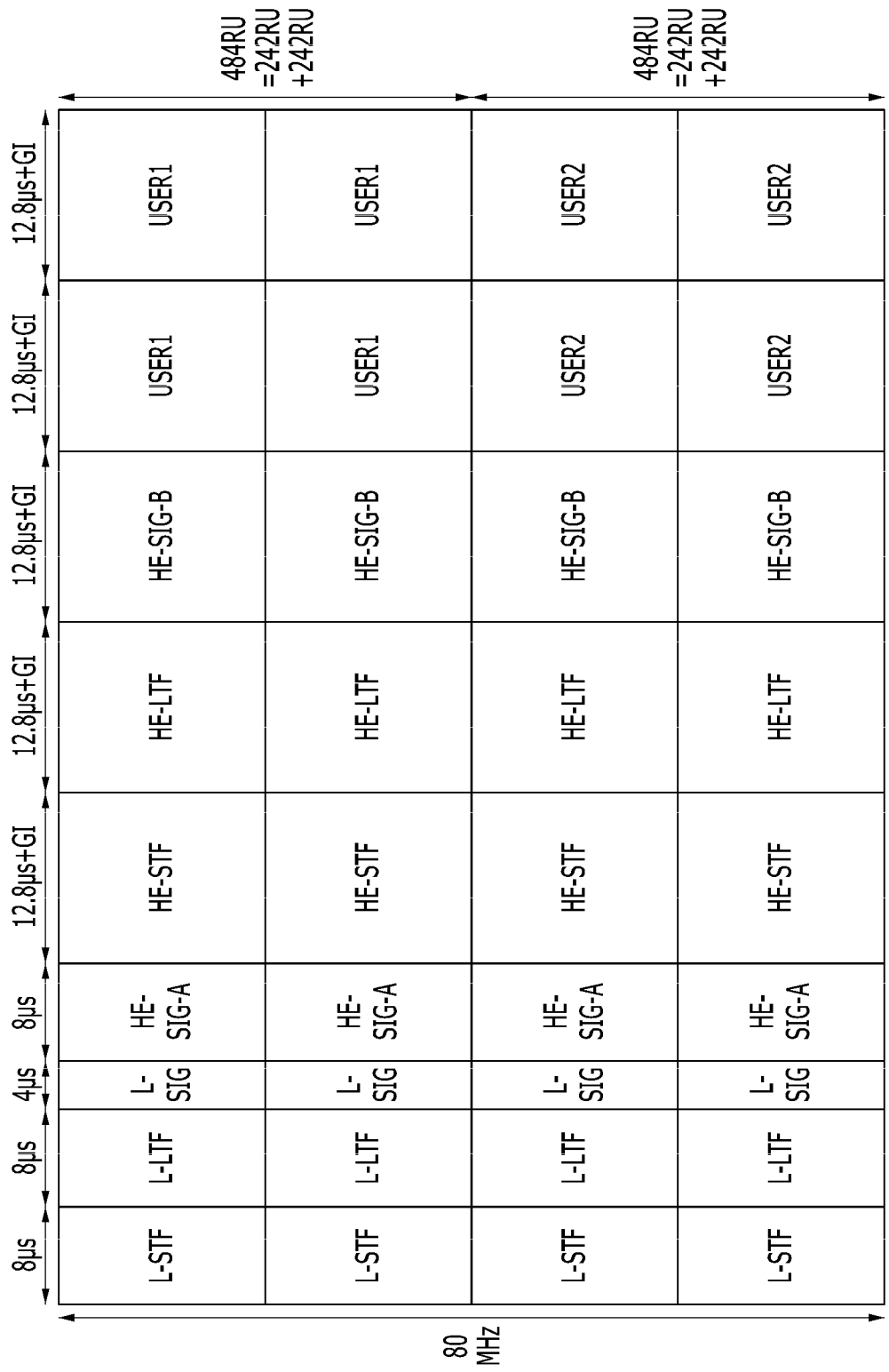

Referring to FIG. 32, a 484-tone resource unit 484RU may be allocated to a user (user 1) in the 40 MHz band. Accordingly, a device for user 1 can transmit or receive data using the 468 data tones and the 16 pilot tones in each symbol of the data field. In some embodiment, null values may be transmitted through tones excluding 484 tones used in the 484-tone resource unit from the 512 tones.

Since the VHT 160 MHz mode uses the 484 tones, a transmitting device can transmit data by encoding and interleaving the data in the same way as the VHT 160 MHz mode for the 484-tone resource unit, for example, in the downlink transmission. Further, a receiving device can deinterleave and decode the data transmitted on the 484-tone resource unit in the same way as the VHT 160 MHz mode. Accordingly, hardware of the devices supporting the VHT WLAN can be reused such that the transmitting device and the receiving device can transmit and receive the frame shown in FIG. 32.

Figure 35:
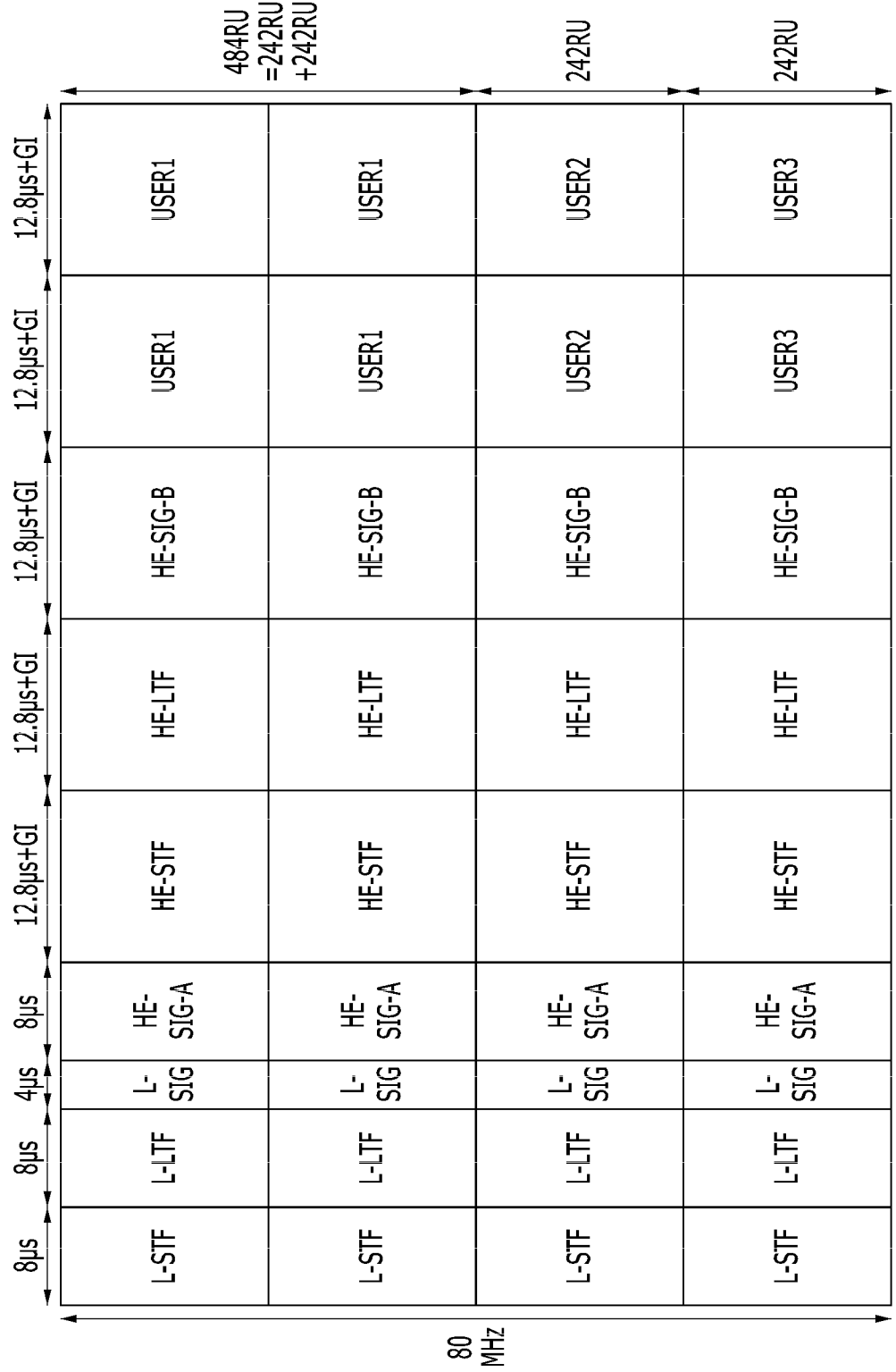
Figure 36:
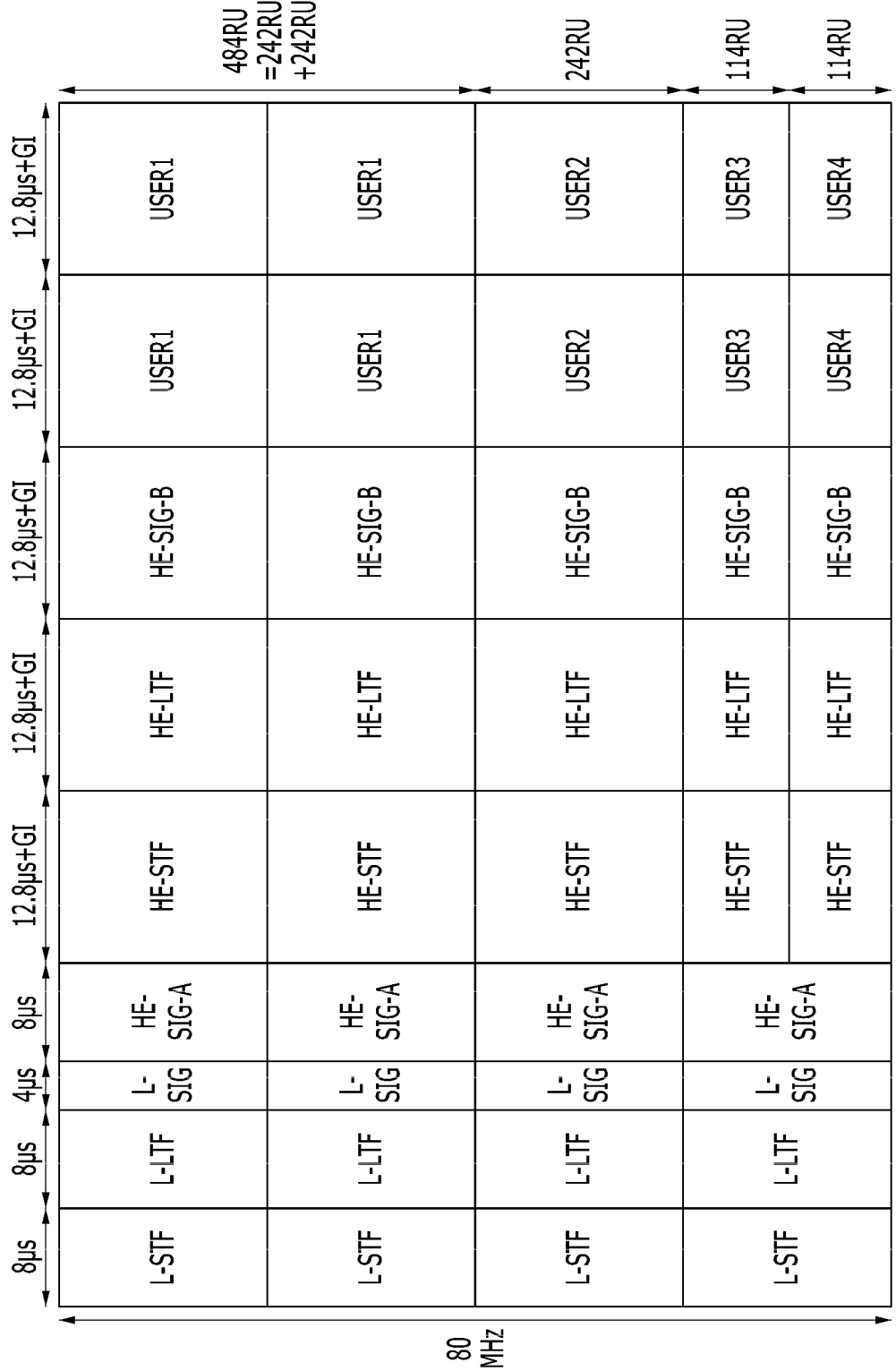
Figure 37:
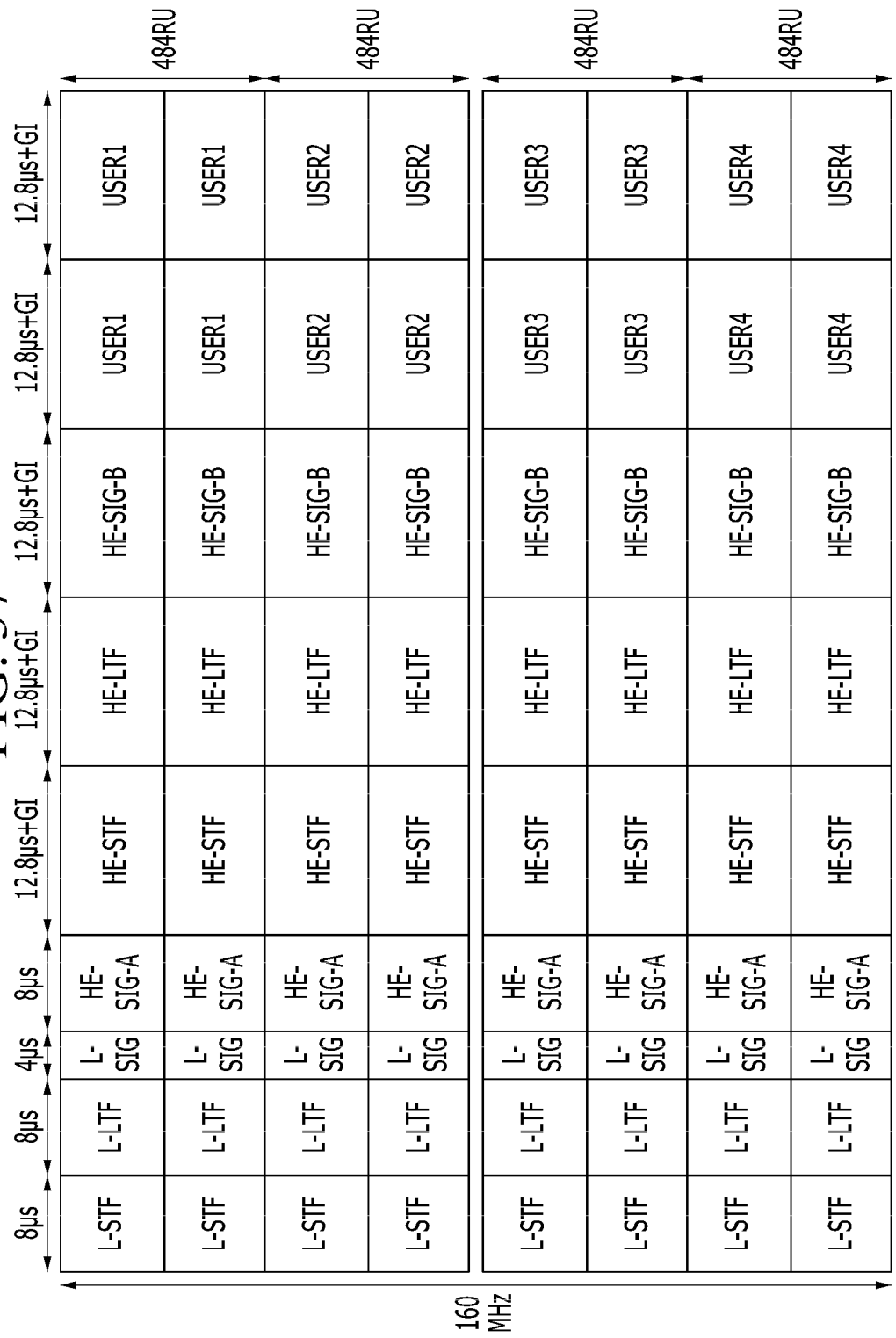
FIG. 37 schematically shows a frame format of a 160 MHz OFDMA mode in a wireless communication network according to an embodiment.

FIG. 33, FIG. 34, FIG. 35, and FIG. 36 schematically show frame formats of an 80 MHz OFDMA mode in a wireless communication network according to an embodiment, and FIG. 37 schematically shows a frame format of a 160 MHz OFDMA mode in a wireless communication network according to an embodiment.

Referring to FIG. 33 to FIG. 36, an 80 MHz band may be divided into one or more subbands, i.e., one or more resource units in a HE 80 MHz OFDMA mode supporting the 40 MHz band. A frame of the HE 80 MHz OFDMA mode includes a legacy preamble part, a HE preamble part, and a data field.

The legacy preamble part includes a legacy short training field (L-STF), a legacy long training field (L-LTF), and a legacy signal field (L-SIG). The HE preamble part includes a HE signal field (HE-SIG-A), a HE short training field (HE-STF), and a HE long training field (HE-LTF). The HE preamble part may further include an additional HE signal field (HE-SIG-B).

The L-STF, the L-LTF, the L-SIG, and the HT-SIG-A are not transmitted on each subband and are transmitted by being encoded by a basic bandwidth unit, i.e., the 20 MHz bandwidth unit. The legacy preamble part and the HE-SIG-A of one 20 MHz bandwidth may be duplicated to three other 20 MHz bandwidths. The data field is transmitted by being encoded by a subband unit, and the data field transmitted on each subband may include data for an allocated device.

In some embodiments, as shown in FIG. 33 to FIG. 36, the HE-STF, the HE-LTF, and the HE-SIG-B may be also transmitted by being encoded by the subband unit. In another embodiment, the HE-STF used for automatic gain control may be transmitted by being encoded by the 20 MHz bandwidth unit differently from an embodiment shown in FIG. 28 to FIG. 32. In yet another embodiment, when the HE-SIG-B is positioned between the HE-SIG-A and the HE-STF, the HE-SIG-B may be also transmitted by being encoded by the 20 MHz bandwidth unit.

As described with reference to FIG. 15 to FIG. 21, the data field may use subcarrier spacing (i.e., 78.125 kHz) that corresponds to ¼ of the subcarrier spacing in the legacy preamble part. For this, an FFT with four times as many points as the FFT of the legacy preamble part (hereinafter, a four times FFT), i.e., a 256 point FFT on the 20 MHz basic bandwidth, may be used. In one embodiment, the four times FFT of the legacy preamble part may be used in remaining fields excluding the HE-SIG-A from the HE preamble part as shown in FIG. 33 to FIG. 36. In another embodiment, an FFT having the same size as the FFT of the legacy preamble part may be used in the HE-STF of the HE preamble part. In yet another embodiment, the FFT having the same size as the FFT of the legacy preamble part may be used in the HE-STF and the HE-SIG-B of the HE preamble part.

Referring to FIG. 33 again, the 1024 tones that can be used in the 80 MHz band may be divided into four 242-tone resource units 242RU, and the four 242-tone resource units 242RU may be allocated to four users (user 1, user 2, user 3, and user 4), respectively. Accordingly, a device for each user can transmit or receive data using the 234 data tones and the 8 pilot tones in each symbol of the data field. In some embodiment, null values may be transmitted through tones excluding 968 tones used in the four 242-tone resource units from the 1024 tones.

Since the VHT 080 MHz mode uses the 242 tones, a transmitting device can transmit data by encoding and interleaving the data in the same way as the VHT 80 MHz mode for each 242-tone resource unit, for example, in the downlink transmission. Further, a receiving device for each user can deinterleave and decode the data transmitted on the 242-tone resource unit in the same way as the VHT 80 MHz mode. Accordingly, hardware of the devices supporting the VHT WLAN can be reused such that the transmitting device and the receiving device can transmit and receive the frame shown in FIG. 33.

Referring to FIG. 31, the 80 MHz band may be divided into two 484-tone resource units 484RU, and the two 484-tone resource units 484RU may be allocated to two users (user 1 and user 2), respectively. Accordingly, a device user 1 or 2 can transmit or receive data using the 468 data tones and the 16 pilot tones in each symbol of the data field. In some embodiment, null values may be transmitted through tones excluding 968 tones used in the two 484-tone resource units from the 1024 tones.

Since the VHT 160 MHz mode uses the 484 tones, a transmitting device can transmit data by encoding and interleaving the data in the same way as the VHT 160 MHz mode for the 484-tone resource unit, for example, in the downlink transmission. Further, a receiving device for user 1 or 2 can deinterleave and decode the data transmitted on the 484-tone resource unit in the same way as the VHT 160 MHz mode. Accordingly, hardware of the devices supporting the VHT WLAN can be reused such that the transmitting device and the receiving device can transmit and receive the frame shown in FIG. 34.

Referring to FIG. 35, the 80 MHz band may be divided into one 484-tone resource unit 484RU and two 242-tone resource units 242RU, and the 484-tone resource unit 484RU and the two 242-tone resource units 242RU may be allocated to three users (user 1, user 2, and user 3), respectively. Accordingly, a device for user 1 can transmit or receive data using the 468 data tones and the 16 pilot tones in each symbol of the data field. A device for user 2 or 3 can transmit or receive data using the 234 data tones and the 8 pilot tones in each symbol of the data field. In some embodiment, null values may be transmitted through tones excluding 968 tones used in the 484-tone resource unit and the two 242-tone resource units from the 256 tones.

Since the VHT 80 MHz mode uses the 242 tones and the VHT 160 MHz mode uses the 484 tones, a transmitting device can transmit data by encoding and interleaving the data in the same way as the VHT 80 MHz mode for the 242-tone resource unit and transmit data by encoding and interleaving the data in the same way as the VHT 160 MHz mode for each 484-tone resource unit, for example, in the downlink transmission. Further, a receiving device for user 1 can deinterleave and decode the data transmitted on the 484-tone resource unit in the same way as the VHT 160 MHz mode, and a receiving device for user 2 or 3 can deinterleave and decode the data transmitted on the 242-tone resource unit in the same way as the VHT 80 MHz mode. Accordingly, hardware of the devices supporting the VHT WLAN can be reused such that the transmitting device and the receiving device can transmit and receive the frame shown in FIG. 35.

While it has been shown in FIG. 35 that the 484-tone resource unit is allocated to user 1, the 484-tone resource unit may be allocated to user 2 or user 3.

Referring to FIG. 36, the 80 MHz band may be divided into one 484-tone resource unit 484RU, one 242-tone resource unit 242RU, and two 114-tone resource units 114RU, and the 484-tone resource unit 484RU, the 242-tone resource unit 242RU, and the two 114-tone resource units 114RU may be allocated to four users (user 1, user 2, user 3, and user 4), respectively. Accordingly, a device for user 1 can transmit or receive data using the 468 data tones and the 16 pilot tones in each symbol of the data field. A device for user 2 can transmit or receive data using the 234 data tones and the 8 pilot tones in each symbol of the data field. A device for user 3 or 4 can transmit or receive data using the 108 data tones and the 6 pilot tones in each symbol of the data field. In some embodiment, null values may be transmitted through tones excluding 954 tones used in the 484-tone resource unit, the 242-tone resource unit, and the two 114-tone resource units from the 1024 tones.

Since the VHT 40 MHz mode uses the 114 tones, the VHT 80 MHz mode uses the 242 tones, and the VHT 160 MHz mode uses the 484 tones, a transmitting device can transmit data by encoding and interleaving the data in the same way as the VHT 160 MHz mode for the 484-tone resource unit, transmit data by encoding and interleaving the data in the same way as the VHT 80 MHz mode for the 242-tone resource unit, and transmit data by encoding and interleaving the data in the same way as the VHT 40 MHz mode for each 114-tone resource unit, for example, in the downlink transmission. Further, a receiving device for user 1 can deinterleave and decode the data transmitted on the 484-tone resource unit in the same way as the VHT 160 MHz mode, and a receiving device for user 2 can deinterleave and decode the data transmitted on the 242-tone resource unit in the same way as the VHT 80 MHz mode. A receiving device for user 3 or 4 can deinterleave and decode the data transmitted on the 114-tone resource unit in the same way as the VHT 40 MHz mode. Accordingly, hardware of the devices supporting the VHT WLAN can be reused such that the transmitting device and the receiving device can transmit and receive the frame shown in FIG. 36.

In yet another embodiment, the 106-tone resource unit may be used instead of the 114-tone resource unit.

While it has been shown in FIG. 36 that the 484-tone resource unit is allocated to user 1, the 242-tone resource unit is allocated to user 2, and the 114-tone resource units are allocated to users 3 and 4, a different combination of these resource units may allocated to user 1, user 2, user 3, and user 4.

The HE 160 MHz OFDMA mode may be transmitted in a form in which the HE 80 MHz OFDMA mode is repeated twice. Accordingly, as shown in FIG. 37, the 160 MHz band may be divided into four 484-tone resource units 484RU, and the four 484-tone resource units 484RU may be allocated to four users (user 1, user 2, user 3, and user 4).

Accordingly, a device for each user can transmit or receive data using the 468 data tones and the 16 pilot tones in each symbol of the data field. In some embodiment, null values may be transmitted through tones excluding 1936 tones used in the four 484-tone resource units from the 2048 tones.

Since the VHT 160 MHz mode uses the 484 tones, a transmitting device can transmit data by encoding and interleaving the data in the same way as the VHT 160 MHz mode for each 484-tone resource unit, for example, in the downlink transmission. Further, a receiving device for each user can deinterleave and decode the data transmitted on the 114-tone resource unit in the same way as the VHT 160 MHz mode. Accordingly, hardware of the devices supporting the VHT WLAN can be reused such that the transmitting device and the receiving device can transmit and receive the frame shown in FIG. 37.

The resource units described with reference to FIG. 15 to FIG. 37 can be summarized as in Table 1.

TABLE 1

| Number of subchannels | Sub-channel allocation for OFDMA | | | |
|---|---|---|---|---|
| | 20 MHz | 40 MHz | 80 MHz | 160 MHz |
| 1 | 242 | 484 | — | — |
| 2 | (114, 114) | (242, 242) | (484, 484) | — |
| 3 | (114, 52, 52) | (242, 114, 114) | (484, 242, 242) | — |
| | (52, 114, 52) | (114, 242, 114) | (242, 484, 242) | — |
| | (52, 52, 114) | (114, 114, 242) | (242, 242, 484) | — |
| 4 | (114, 52, 26, 26) | (242, 114, 52, 52) | (484, 242, 114, 114) | — |
| | (114, 26, 52, 26) | (242, 52, 114, 52) | (484, 114, 242, 114) | — |
| | (114, 26, 26, 52) | (242, 52, 52, 114) | (484, 114, 114, 242) | — |
| | (52, 114, 26, 26) | (114, 242, 52, 52) | (242, 484, 114, 114) | — |
| | (26, 114, 52, 26) | (52, 242, 114, 52) | (114, 484, 242, 114) | — |
| | (26, 114, 26, 52) | (52, 242, 52, 114) | (114, 484, 114, 242) | — |
| | (52, 26, 114, 26) | (114, 52, 242, 52) | (242, 114, 484, 114) | — |
| | (26, 52, 114, 26) | (52, 114, 242, 52) | (114, 242, 484, 114) | — |
| | (26, 26, 114, 52) | (52, 52, 242, 114) | (114, 114, 484, 242) | — |
| | (52, 26, 26, 114) | (114, 52, 52, 242) | (242, 114, 114, 484) | — |
| | (26, 52, 26, 114) | (52, 114, 52, 242) | (114, 242, 114, 484) | — |
| | (26, 26, 52, 114) | (52, 52, 114, 242) | (114, 114, 242, 484) | — |
| | (52, 52, 52, 52) | (114, 114, 114, 114) | (242, 242, 242, 242) | (484, 484, 484, 484) |

In Table 1, (a,b) represents a case that tones with a and b are allocated to two users respectively, (a,b,c) represents a case that tones with a, b, and c are allocated to three user respectively, and (a,b,c,d) represents a case that tones with a, b, c, and are allocated to four users respectively.

According to above embodiments, since the 26-tone resource unit is used as the minimum resource unit, hardware of devices supporting the previous WLAN, for example the IEEE standard 802.11ah can be reused. In some embodiments, since the 52-tone resource unit or the 56-tone resource unit is used as a resource unit that is greater than the 26-tone resource unit, the hardware of devices supporting the previous WLAN, for example the VHT WLAN can be reused. In some embodiment, since the 114-tone resource unit, the 242-tone resource unit, and the 484-tone resource unit are used as resource units that are greater than the 52-tone resource unit or the 56-tone resource unit, the hardware of devices supporting the previous WLAN, for example the VHT WLAN can be reused.

In some embodiments, when the 52-tone resource unit is used, the 106-tone resource unit may be used as the resource unit that is greater than the 52-tone resource unit may be used, for the compatibility.

While it has been described in FIG. 15 to FIG. 37 that the null values are transmitted on through tones which are remained after the resource units are allocated to the users, the remaining tones may be allocated to other user in some embodiments. For example, since 56 or 70 tones are remained in FIG. 33 to FIG. 36, the 26-tone resource unit may be additionally used. After the additional 26-tone resource unit is used, remaining 30 or 44 tones may be used as DC tones and guard tones.

While it has been shown in FIG. 15 to FIG. 37 that the resource units are allocated to four or less users, the resource units may be allocated to four or more users in some embodiments. For example, 26-tone resource units may be allocated to eight users respectively in the HE 20 MHz OFDMA mode.

While it has been shown in FIG. 15 to FIG. 37 that the resource units are allocated to the users in the data field, the resource units may be allocated to the users in the HE-LTF of the HE preamble part according to some embodiments. In another embodiment, the resource units may be allocated to the users in the HE-STF and the HE-SIG-B of the HE preamble part.

As described with reference to FIG. 15 to FIG. 37, the transmitting device can form a resource block using various resource units. Accordingly, an allocation scheme of the resource block may be shared between the transmitting device and the receiving device such that the receiving device can know its allocated resource unit.

In an example shown in Table 1, since eighteen resource block allocation schemes exist in each band, resource block allocation information may have 5 bits to differentiate the resource block allocation schemes. The eighteen resource block allocation schemes may correspond to values of 0 to 17 among values of 0 to 31 represented by 5 bits.

In another embodiment, when only one user exists, an OFDM transmission may be used. Accordingly, the resource block allocation information may further have one bit for differentiating the OFDM transmission and the OFDMA transmission. That is, the resource block allocation information may have 6 bits.

In yet another embodiment, the OFDM transmission may be indicated by any one of values (for example, values of 18 to 31) that do not correspond to the eighteen resource block allocation schemes among the values of 0 to 31 represented by the resource block allocation information with 5 bits.

In some embodiments, the transmitting device may provide the receiving device with information on the resource unit allocated to the receiving device instead of the resource block allocation scheme.

Next, a frame transmitting method and a frame receiving method in a wireless communication network according to an embodiment are described with reference to FIG. 38 and FIG. 39.

Figure 38:
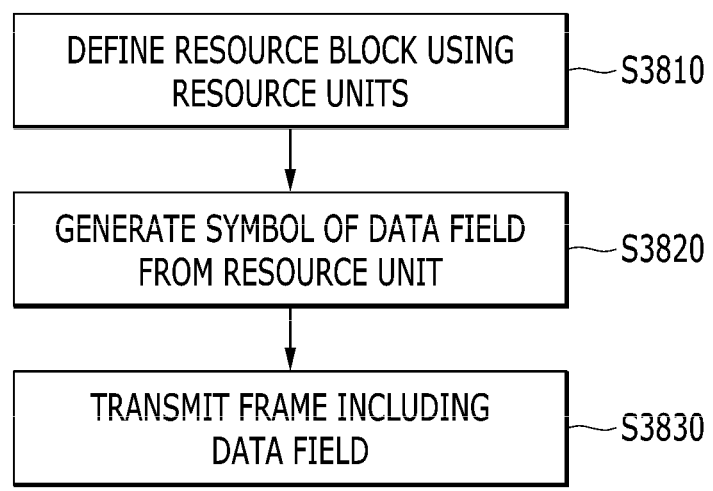
FIG. 38 is a flowchart showing a frame transmitting method in a wireless communication network according to an embodiment.
Figure 39:
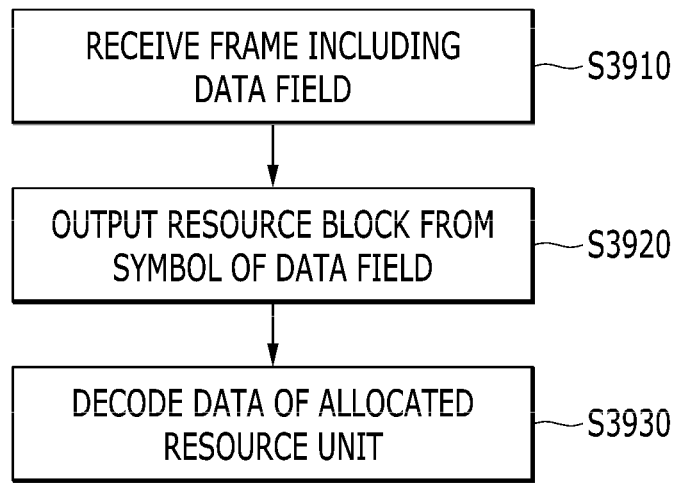
FIG. 39 is a flowchart showing a frame receiving method in a wireless communication network according to an embodiment.

FIG. 38 is a flowchart showing a frame transmitting method in a wireless communication network according to an embodiment, and FIG. 39 is a flowchart showing a frame receiving method in a wireless communication network according to an embodiment.

Referring to FIG. 38, a transmitting device defines a resource block using at least part of a plurality of resource units having the different number of tones (S3810). Each resource unit of the resource block is allocated data for a corresponding user.

The plurality of resource units includes a 26-tone resource unit, and two tones in 26 tones of the 26-tone resource unit are pilot tones. In one embodiment, the 26-tone resource unit may be a minimum resource unit among the plurality of resource units. The plurality of resource unit further includes a 242-tone resource unit, and eight tones in 242 tones of the 242-tone resource unit are pilot tones. In one embodiment, the 242-tone resource unit may be a maximum resource unit among the plurality of resource units.

In some embodiments, the plurality of resource units have four types of resource units in a 20 MHz band. In embodiment, the second resource unit among the four types of resource units may be a 52-tone resource unit. Four tones in 52 tones of the 52-tone resource unit are pilot tones. In another embodiment, the second resource unit among the four types of resource units may be a 56-tone resource unit. Four tones in 56 tones of the 56-tone resource unit are pilot tones. In yet another embodiment, the third resource unit may be a 114-tone resource unit. Six tones in 114 tones of the 114-tone resource unit are pilot tones. In still another embodiment, the number of tones in the third resource unit may be a sum of two and twice of the number of tones in the second resource unit.

In some embodiments, a 40 MHz band uses resource units of the same types as resource units used in the 20 MHz band. When an entire band of the 40 MHz band is used, the 40 MHz band may further use a 484-tone resource unit that is twice the 242-tone resource unit.

In this case, the plurality of resource units may have five types of resource units. In embodiment, among the five types of resource units, the second resource unit may be a 52-tone resource unit and the fourth resource unit may be a 242-tone resource unit. Eight tones in 242 tones of the 242-tone resource unit are pilot tones. In another embodiment, the second resource unit may be a 56-tone resource unit. In yet another embodiment, the third resource unit may be a 114-tone resource unit. In still another embodiment, the number of tones in the third resource unit may be a sum of two and twice of the number of tones in the second resource unit.

In some embodiments, an 80 MHz band uses resource units of the same types as resource units used in the 20 MHz band. The 80 MHz band may further use a 484-tone resource unit that is used in the entire band of the 40 MHz band. When an entire band of the 80 MHz band is used, the 80 MHz band may further use a 968-tone resource unit having a form in which the 242-tone resource unit is repeated four times. The 968-tone resource unit uses 234*4 (=936) data tones and 8*4 (=32) pilot tones.

In this case, the plurality of resource units may have six types of resource units. In embodiment, among the six types of resource units, the second resource unit may be a 52-tone resource unit, the fourth resource unit may be a 242-tone resource unit, and the fifth resource unit may be a 484-tone resource unit. Sixteen tones in 484 tones of the 484-tone resource unit are pilot tones. In another embodiment, the second resource unit may be a 56-tone resource unit. In yet another embodiment, the third resource unit may be a 114-tone resource unit. In still another embodiment, the number of tones in the third resource unit may be a sum of two and twice of the number of tones in the second resource unit.

The transmitting device generates a symbol of a data field using the resource block (S3820). The transmitting device may perform an inverse Fourier transform to allow a length of symbol duration excluding a GI in the symbol of the data field to be 12.8 μs. In one embodiment, the transmitting device may apply a 256 point FFT on the 20 MHz basic bandwidth to allow the symbol of the data field to have subcarrier spacing of 78.125 kHz.

Next, the transmitting device transmits a frame including the data field (S3830).

While the steps S3810 and S3820 have been sequentially shown in FIG. 38, the steps S3810 and S3820 may be performed in a different order. Alternatively, the steps S3810 and S3820 may be performed at the same time.

Referring to FIG. 39, a receiving device receives a frame including the data field (S3910). A length of symbol duration excluding a GI in a symbol of the data field is 12.8 μs. In one embodiment, the symbol of the data field may have subcarrier spacing of 78.125 kHz.

The receiving device processes the received frame (S3920).

In one embodiment, the receiving device may output a resource block by performing a Fourier transform on the symbol of the data field (S3920). The receiving device may apply a 256 point FFT on the 20 MHz basic bandwidth when performing the Fourier transform.

The resource block is defined using at least part of a plurality of resource units having the different number of tones. The plurality of resource units includes a 26-tone resource unit, and two tones in 26 tones of the 26-tone resource unit are pilot tones. In one embodiment, the 26-tone resource unit may be a minimum resource unit among the plurality of resource units. The plurality of resource unit further includes a 242-tone resource unit, and eight tones in 242 tones of the 242-tone resource unit are pilot tones. In one embodiment, the 242-tone resource unit may be a maximum resource unit among the plurality of resource units.

In some embodiments, the plurality of resource units have four types of resource units in a 20 MHz band. In embodiment, the second resource unit among the four types of resource units may be a 52-tone resource unit. Four tones in 52 tones of the 52-tone resource unit are pilot tones. In another embodiment, the second resource unit among the four types of resource units may be a 56-tone resource unit. Four tones in 56 tones of the 56-tone resource unit are pilot tones. In yet another embodiment, the third resource unit may be a 114-tone resource unit. Six tones in 114 tones of the 114-tone resource unit are pilot tones. In still another embodiment, the number of tones in the third resource unit may be a sum of two and twice of the number of tones in the second resource unit.

In some embodiments, a 40 MHz band uses resource units of the same types as resource units used in the 20 MHz band. When an entire band of the 40 MHz band is used, the 40 MHz band may further use a 484-tone resource unit that is twice the 242-tone resource unit.

In this case, the plurality of resource units may have five types of resource units. In embodiment, among the five types of resource units, the second resource unit may be a 52-tone resource unit and the fourth resource unit may be a 242-tone resource unit. Eight tones in 242 tones of the 242-tone resource unit are pilot tones. In another embodiment, the second resource unit may be a 56-tone resource unit. In yet another embodiment, the third resource unit may be a 114-tone resource unit. In still another embodiment, the number of tones in the third resource unit may be a sum of two and twice of the number of tones in the second resource unit.

In some embodiments, an 80 MHz band uses resource units of the same types as resource units used in the 20 MHz band. The 80 MHz band may further use a 484-tone resource unit that is used in the entire band of the 40 MHz band. When an entire band of the 80 MHz band is used, the 80 MHz band may further use a 968-tone resource unit having a form in which the 242-tone resource unit is repeated four times. The 968-tone resource unit uses 234*4 (=936) data tones and 8*4 (=32) pilot tones.

In this case, the plurality of resource units may have six types of resource units. In embodiment, among the six types of resource units, the second resource unit may be a 52-tone resource unit, the fourth resource unit may be a 242-tone resource unit, and the fifth resource unit may be a 484-tone resource unit. Sixteen tones in 484 tones of the 484-tone resource unit are pilot tones. In another embodiment, the second resource unit may be a 56-tone resource unit. In yet another embodiment, the third resource unit may be a 114-tone resource unit. In still another embodiment, the number of tones in the third resource unit may be a sum of two and twice of the number of tones in the second resource unit.

The receiving device may decode data allocated to the receiving device from the resource block (S3930).

While the steps S3920 and S3930 have been sequentially shown in FIG. 39, the steps S3920 and S3930 may be performed in a different order. Alternatively, the steps S3920 and S3930 may be performed at the same time.

Next, an embodiment where a transmitting device determines which resource unit is allocated to a receiving device is described with reference to FIG. 40 and FIG. 41.

Figure 40:
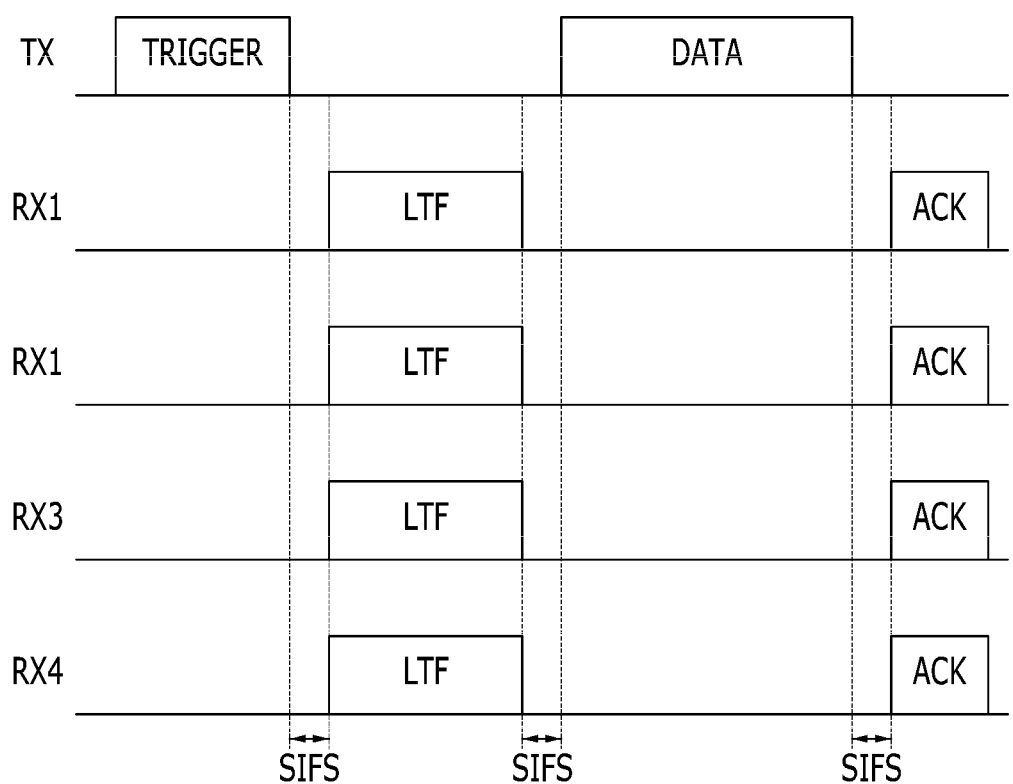
FIG. 40 shows channel estimation of a transmitting device in a wireless communication network according to an embodiment.
Figure 41:
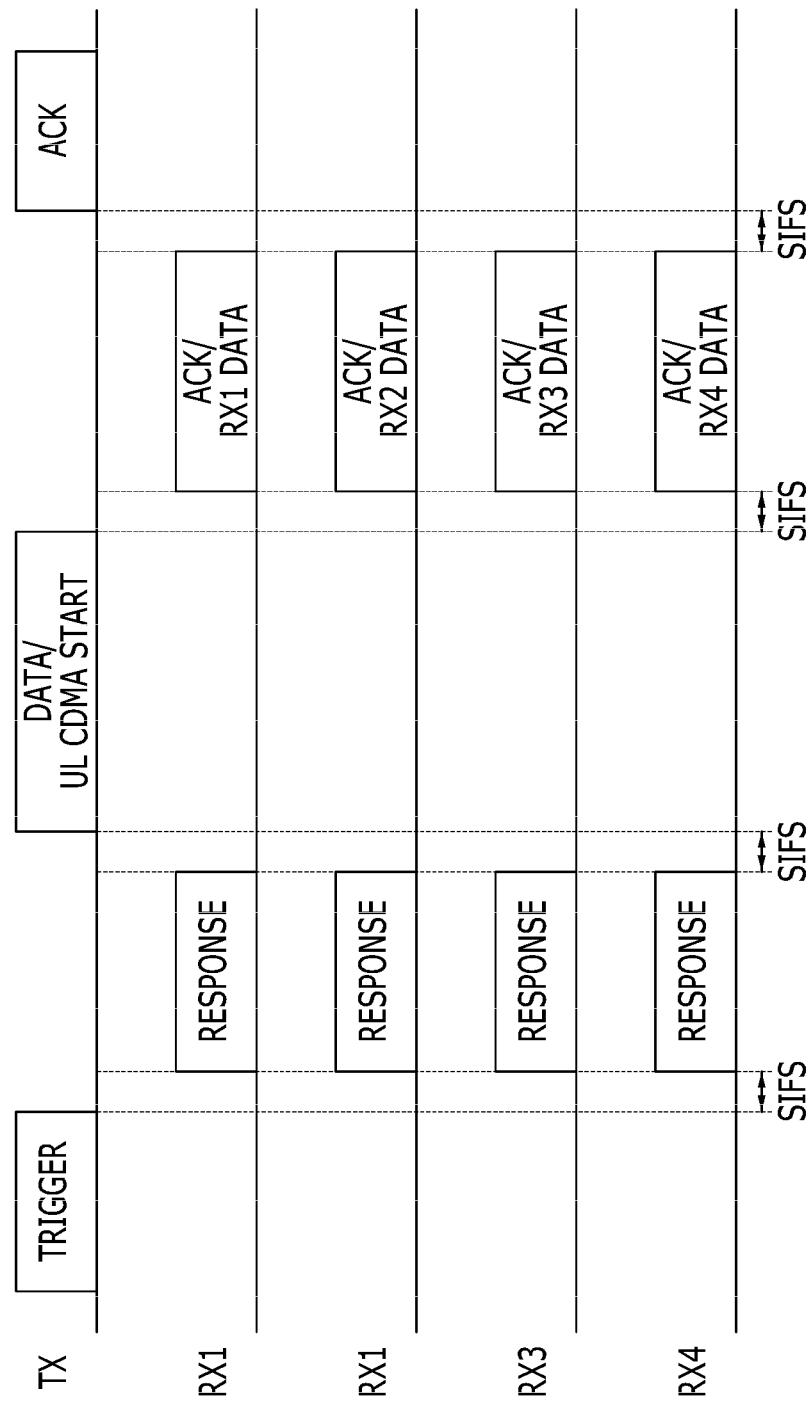
FIG. 41 shows channel estimation of a receiving device in a wireless communication network according to an embodiment.

FIG. 40 shows channel estimation of a transmitting device in a wireless communication network according to an embodiment, and FIG. 41 shows channel estimation of a receiving device in a wireless communication network according to an embodiment.

Referring to FIG. 40, a transmitting device transmits a trigger frame to a plurality of receiving device in order to know channel information of an entire band.

Each receiving device transmits an LTF frame including a HE long training field (HE-LTF) to the transmitting device. The LTF frame does not include a data field and includes a plurality of HE-LTFs. The number of the HE-LTFs may correspond to the number of the receiving devices.

In this case, an identification code (for example, a Hadamard orthogonal code) for each receiving device may be used for the HE-LTFs included in the corresponding LTF frame in order to differentiate LTF frames which are transmitted by the receiving devices. The trigger frame which is transmitted by the transmitting device may include information on the HE-LTFs to be used by the receiving devices. In one embodiment, the information of the HE-LTFs may include information indicating the number of the receiving devices (i.e., users) for transmitting the LTF frames and the identification code) to be used by each receiving device.

As such, when the receiving devices transmit the LTF frames using the different identification codes, the transmitting device may dispread the received HE-LTFs and then measure an average SNR per subband for each receiving device.

Therefore, the transmitting device may determine a subband, i.e., a resource unit to be allocated to each receiving device based on the average SNR per subband for each receiving device and an amount of data to be transmitted to each receiving device. Further, the transmitting device may further determine a coding and modulation scheme (MCS) to be applied to each receiving device.

Accordingly, the transmitting device can perform a downlink OFDMA transmission to the receiving devices with optimum conditions. The transmitting device may a data frame to the receiving devices and each receiving device may transmit an ACK frame on the data frame.

As shown in FIG. 41, in some embodiments, the downlink OFDMA transmission may be performed together with an uplink code division multiple access (CDMA) transmission.

Referring to FIG. 41, a transmitting device transmits a trigger frame for requesting channel estimation to a plurality of receiving devices.

Each receiving device receiving the trigger frame transmits a response frame including channel information to the transmitting device. The channel information may include an average SNR per subband. The response frame may further include an amount of data to be transmitted by the corresponding receiving device. The response frame may further include a type of an access category (AC) to be transmitted by the corresponding receiving device.

The transmitting device receiving the response frames from the receiving devices determines a subband, i.e., a resource unit to be allocated to each receiving device based on the average SNR per subband of each receiving device. The transmitting device transmits a downlink data frame to the receiving devices in an OFDMA scheme. The transmitting device may transmit an uplink CDMA start frame instructing the receiving devices to start an uplink CDMA transmission. The uplink CDMA start frame may include information on an identification code to be used by each receiving device for the CDMA transmission. Alternatively, the information carried by the uplink CDMA start frame, i.e., the information on the identification code may be included in the downlink data frame. Here, the CDMA transmission means a transmission scheme where a plurality of devices simultaneously transmit data by using unique identification codes, and is not limited to a specific cellular communication transmission scheme.

Each receiving device transmits an ACK frame on the downlink data frame and an uplink data frame including data to be transmitted to the transmitting device, using the CDMA scheme. Alternatively, ACK information of the ACK frame may be included in the uplink data frame.

The transmitting device receiving the uplink data frames from the receiving devices transmits an ACK frame to the receiving devices using the OFDMA scheme.

In FIG. 40 and FIG. 41, the transmitting device may be a HE-AP and the receiving devices may be HE-STAs. An interval between two frames may be a SIFS interval.

A frame transmitting method and a frame receiving method according to above embodiments may be executed by a baseband processor 10 shown in FIG. 1 to FIG. 3. In one embodiment, instructions for executing the frame transmitting method and the frame receiving method according to above embodiments may be stored in a non-transitory computer-readable recording medium such as a memory 40. In another embodiment, at least some of the instructions may be MAC software. In yet another embodiment, at least some of the instructions may be transmitted from a non-transitory computer-readable recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. A method of transmitting a frame by a device in a wireless communication network, the method comprising:
    generating a symbol using a part of a plurality of resource units having a different number of tones, a length of symbol duration excluding a guard interval in the symbol being 12.8 μs; and
    transmitting a frame including the symbol,
    wherein the plurality of resource units includes a first resource unit having 26 tones, a second resource unit having 52 tones, and a third resource unit having 242 tones,
    wherein two tones in the 26 tones of the first resource unit are used as pilot tones, four tones in the 52 tones of the second resource unit are used as pilot tones, and eight tones in the 242 tones of the third resource unit are used as pilot tones, and
    wherein the frame is transmitted on a 20 MHz band.

2. The method of claim 1, wherein subcarrier spacing of the symbol is 78.125 kHz.

3. The method of claim 1, wherein the first resource unit is a minimum resource unit among the plurality of resource units.

4. The method of claim 1, wherein the plurality of resource units have four types of resource units when the frame is transmitted on the 20 MHz band.

5. The method of claim 1, wherein the symbol includes 256 tones when the frame is transmitted on the 20 MHz band.

6. A method of receiving a frame by a device in a wireless communication network, the method comprising:
    receiving a frame including a symbol, a length of symbol duration excluding a guard interval in the symbol being 12.8 μs; and
    decoding data included in a part of a plurality of resource units having a different number of tones, from the symbol,
    wherein the plurality of resource units includes a first resource unit having 26 tones, a second resource unit having 52 tones, and a third resource unit having 242 tones,
    wherein two tones in the 26 tones of the first resource unit are used as pilot tones, four tones in the 52 tones of the second resource unit are used as pilot tones, and eight tones in the 242 tones of the third resource unit are used as pilot tones, and
    wherein the frame is received on a 20 MHz band.

7. The method of claim 6, wherein subcarrier spacing of the symbol is 78.125 kHz.

8. The method of claim 6, wherein the first resource unit is a minimum resource unit among the plurality of resource units.

9. The method of claim 6, wherein the plurality of resource units have four types of resource units when the frame is received on the 20 MHz band.

10. The method of claim 6, wherein the symbol includes 256 tones when the frame is received on the 20 MHz band.

* * * * *